US009967703B1

United States Patent
Ahmedin

(10) Patent No.: US 9,967,703 B1
(45) Date of Patent: May 8, 2018

(54) ESTIMATING WHETHER A WIRELESS TERMINAL IS INDOORS OR OUTDOORS BASED ON METADATA THAT DESCRIBES PACKET-LEVEL COMMUNICATIONS

(71) Applicant: Polaris Wireless, Inc., Mountain View, CA (US)

(72) Inventor: Ahmed Ahmedin, Davis, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 126 days.

(21) Appl. No.: 15/189,472

(22) Filed: Jun. 22, 2016

(51) Int. Cl.
*H04W 4/00* (2018.01)
*H04W 4/02* (2018.01)
*H04L 29/06* (2006.01)

(52) U.S. Cl.
CPC ............ *H04W 4/02* (2013.01); *H04L 69/22* (2013.01)

(58) Field of Classification Search
CPC ....... H04L 12/1845; H04L 69/22; H04W 4/02
USPC ........................................................ 370/328
See application file for complete search history.

(56) References Cited

U.S. PATENT DOCUMENTS

| 2008/0293396 A1* | 11/2008 | Barnes | H04M 3/42221 455/418 |
|---|---|---|---|
| 2010/0305855 A1* | 12/2010 | Dutton | H04W 4/02 701/469 |
| 2013/0035110 A1* | 2/2013 | Sridhara | H04W 4/029 455/456.1 |
| 2013/0295952 A1* | 11/2013 | Chao | G01S 5/0236 455/456.1 |
| 2016/0014554 A1* | 1/2016 | Sen | H04W 4/029 455/456.2 |
| 2016/0021512 A1* | 1/2016 | Krallman | H04W 4/04 455/456.3 |

OTHER PUBLICATIONS

Ying Zhang et al., "Understanding the Characteristics of Cellular Data Traffic", 978-1-4503-1475-6/12/08, "CellNet'12", Aug. 13, 2012, Publisher: ACM, Published in: FI.

* cited by examiner

*Primary Examiner* — Faisal Choudhury
(74) *Attorney, Agent, or Firm* — McGeary Cukor LLC; Kenneth Ottesen; Jason Paul DeMont

(57) ABSTRACT

A disclosed location engine estimates a wireless terminal as being indoors or outdoors by utilizing information that includes metadata from previous packet-level transmissions involving both i) wireless terminals that are known to have been indoors and ii) wireless terminals that are known to have been outdoors, while the metadata was collected. Based on this metadata for previous transmissions, one or more classification features are computed. Then, for a wireless terminal that is to be classified during a communication transaction (e.g., voice, data, SMS, etc.) with respect to the terminal being either indoors or outdoors, features that are representative of that wireless terminal for the transmissions are evaluated against a characterization that is a composite of one or more previously-computed classification features. The features that are representative of the wireless terminal can be derived from the metadata associated with the wireless terminal during the transaction being analyzed.

20 Claims, 14 Drawing Sheets

| Begin | End | Service | In/Outbound | LON | LAT | Azimuth | Cell_ID_A | Cell_ID_B |
|---|---|---|---|---|---|---|---|---|
| 8/31/09 7:57 | 8/31/09 8:09 | GPRS | outbound | 13.39611111 | 52.52944444 | 30 | 45830 | XXXXXXXXXXX |
| 8/31/09 8:09 | 8/31/09 8:09 | GPRS | outbound | 13.38361111 | 52.53 | 240 | 59015 | XXXXXXXXXXX |
| 8/31/09 8:09 | 8/31/09 8:15 | GPRS | outbound | 13.37472222 | 52.53027778 | 120 | 1845 | XXXXXXXXXXX |
| 8/31/09 8:15 | 8/31/09 8:39 | GPRS | outbound | 13.37472222 | 52.53027778 | 120 | 1845 | XXXXXXXXXXX |
| 8/31/09 8:20 | | | outbound | | | | | |
| 8/31/09 8:20 | | SMS | outbound | 13.38361111 | 52.53 | 240 | 9215 | XXXXXXXXXXX |
| 8/31/09 8:39 | 8/31/09 9:09 | GPRS | outbound | 13.37472222 | 52.53027778 | 120 | 1845 | XXXXXXXXXXX |
| 8/31/09 9:09 | 8/31/09 9:39 | GPRS | outbound | 13.37472222 | 52.53027778 | 120 | 1845 | XXXXXXXXXXX |
| 8/31/09 9:12 | 8/31/09 9:12 | Telephony | outbound | 13.37472222 | 52.53027778 | 120 | 1845 | XXXXXXXXXXX |
| | 8/31/09 9:38 | SMS | inbound | 13.26472222 | 52.54833333 | 30 | XXXXXXXXXXX | 28398 |
| | 8/31/09 9:38 | SMS | inbound | 13.26472222 | 52.54833333 | 30 | XXXXXXXXXXX | 28398 |
| | 8/31/09 9:38 | SMS | inbound | 13.26472222 | 52.54833333 | 30 | XXXXXXXXXXX | 28398 |
| 8/31/09 9:38 | 8/31/09 9:38 | GPRS | outbound | 13.31444444 | 52.57166667 | 240 | 4535 | XXXXXXXXXXX |

ESTIMATING WHETHER A WIRELESS TERMINAL IS INDOORS OR OUTDOORS BASED ON METADATA THAT DESCRIBES PACKET-LEVEL COMMUNICATIONS

FIELD OF THE INVENTION

The present invention relates to telecommunications in general, and, more particularly, to a technique for estimating whether a wireless terminal is indoors or outdoors based on metadata that describes packet-level communications within a telecommunication system.

BACKGROUND OF THE INVENTION

The salient advantage of wireless telecommunications over wireline telecommunications is the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

In some environments, however, signals that are too weak to be usable and environmental conditions that are insufficiently or incorrectly characterized can cause at least some location estimation techniques to produce unreliable location estimates. For example, some indoor environments can cause such problems to occur.

SUMMARY OF THE INVENTION

There are a number of systems in the prior art for estimating the location of a wireless terminal. Several of the factors that affect the accuracy of the estimate are:
i. whether the signals that travel to and from the wireless terminal are impaired (e.g., attenuated, reflected, refracted, etc.) or not,
ii. whether the system knows if the signals have been impaired or not, and
iii. whether the system compensates for the impairment or not.

When the system knows that the signals have been impaired and compensates for the impairment, the accuracy of the estimate can be very good. In contrast, when the system does not know that the signals have been impaired or does not compensate for the impairment, the accuracy of the estimate can be very bad. The military, police, and emergency services often rely on the estimates to be good, and a bad estimate can have serious consequences.

Signals can be impaired by natural objects such as mountains and by man-made objects such as buildings. The impairment caused when a wireless terminal is indoors is particularly insidious, and it is often difficult in the prior art to know that the wireless terminal is indoors.

To address this problem, embodiments of the present invention estimate whether a wireless terminal is indoors or outdoors. Although it is trivial for a human to know whether he or she is indoors or outdoors, and it might seem that it should be simple for a machine to know whether it is indoors or not, it has been a difficult problem.

Embodiments of the present invention estimate whether the wireless terminal is indoors or outdoors by utilizing information for past packet-level transmissions that is readily available in at least some wireless telecommunications systems. Examples of such transmissions include, without being limited to, those associated with voice calls, data calls, and Short Message Service (SMS) transactions, in addition to control plane messages. This call data includes metadata from past calls or other communications transactions involving both i) wireless terminals that are known to have been indoors and ii) wireless terminals that are known to have been outdoors, while the metadata was collected. In particular, the metadata describes packet-level communications between a point within a mobile network operator (MNO) telecommunications network and one or more wireless terminals. The metadata is normally collected by the MNO and maintained in the form of call detail records (CDR) or other types of records.

Based on the metadata, the location engine of the illustrative embodiment calculates one or more classification features. Then, for a particular wireless terminal that is to be classified during a particular communications transaction or transactions with respect to the terminal being indoors or outdoors, the features that are representative of that wireless terminal for the transactions are evaluated by the location engine against a characterization that is a composite of one or more of the previously-computed classification features. The location engine can derive the features that are representative of the wireless terminal from the metadata that describes packet-level communications corresponding to the wireless terminal for the transactions being analyzed. In some embodiments of the present invention, the location engine generates an estimate of a probability that the wireless terminal is indoors (or outdoors).

Once the location engine of the illustrative embodiment has determined that the wireless terminal is probably indoors or probably outdoors, the location engine can use this information accordingly. For example, the cost of generating a location estimate—in terms of time, hardware, money, compute cycles, and energy (e.g., electrical, etc.)—depends on the technique and on the quantity and quality of the empirical data. There are some techniques in which the cost of a location estimate can vary widely based on the quantity and quality of the empirical data. This is particularly true for pattern-matching techniques such as Radio-Frequency Pattern Matching. For these techniques, it is advantageous to employ, when possible, mechanisms that lower the average (or maximum) cost of an estimate. The present invention, as recited in the claims, is one such mechanism. In particular, it is possible to reduce the cost of estimating a location, by recognizing that some estimates of the location of a wireless terminal are improbable. Additionally, in regard to location-based applications, different behaviors can be applied depending on whether the wireless terminal—and, therefore, its user—is estimated to be indoors or outdoors. In some embodiments of the present invention, the location engine of the illustrative embodiment accounts for at least some of the aforementioned considerations and generates an estimate of the location of the wireless terminal accordingly.

An illustrative method of estimating the location of a wireless terminal comprises: receiving, by a computer system, metadata that describes packet-level communications between a mobile network operator (MNO) telecommunications network and the wireless terminal, wherein any identification of a particular application downloaded to the wireless terminal is absent from the metadata; deducing, by the computer system, usage of the application based on the metadata, wherein the usage of the application is responsible for generating at least some of the packet-level communications; and estimating, by the computer system, a probability that the wireless terminal is indoors based the deducing of the usage of the application.

Another method of estimating the location of a wireless terminal comprises: receiving, by a computer system, metadata that describes packet-level communications between a mobile network operator (MNO) telecommunications network and the wireless terminal; receiving, by the computer system, a measurement of a location-dependent trait of a radio signal as received by the wireless terminal; and estimating, by the computer system, a probability that the wireless terminal is indoors based on a characterization of a first classification feature, wherein the characterization is based on the metadata; and generating, by the computer system, an estimate of the location of the wireless terminal based on i) the measurement of the location-dependent trait of the radio signal and ii) the estimated probability that the wireless terminal is indoors.

Yet another method of estimating the location of a wireless terminal comprises: receiving, by a computer system, metadata that describes packet-level communications between a mobile network operator (MNO) telecommunications network and the wireless terminal wherein any indication of the wireless terminal being indoors or outdoors is absent from the metadata; receiving, by the computer system, a measurement of a location-dependent trait of a radio signal as received by the wireless terminal; estimating, by the computer system, a probability that the wireless terminal is indoors based on the metadata; designating, by the computer system, at least one of a plurality of possible locations of the wireless terminal as improbable based on the estimated probability that the wireless terminal is indoors; and generating, by the computer system, an estimate of the location of the wireless terminal as being one of the plurality of possible locations of the wireless terminal not designated as improbable, based on the measurement of the location-dependent trait of the radio signal.

BRIEF DESCRIPTION OF THE DRAWINGS

FIG. 7 depicts an example of a collection of metadata that describes packet-level communications.

DETAILED DESCRIPTION

Figure 1:
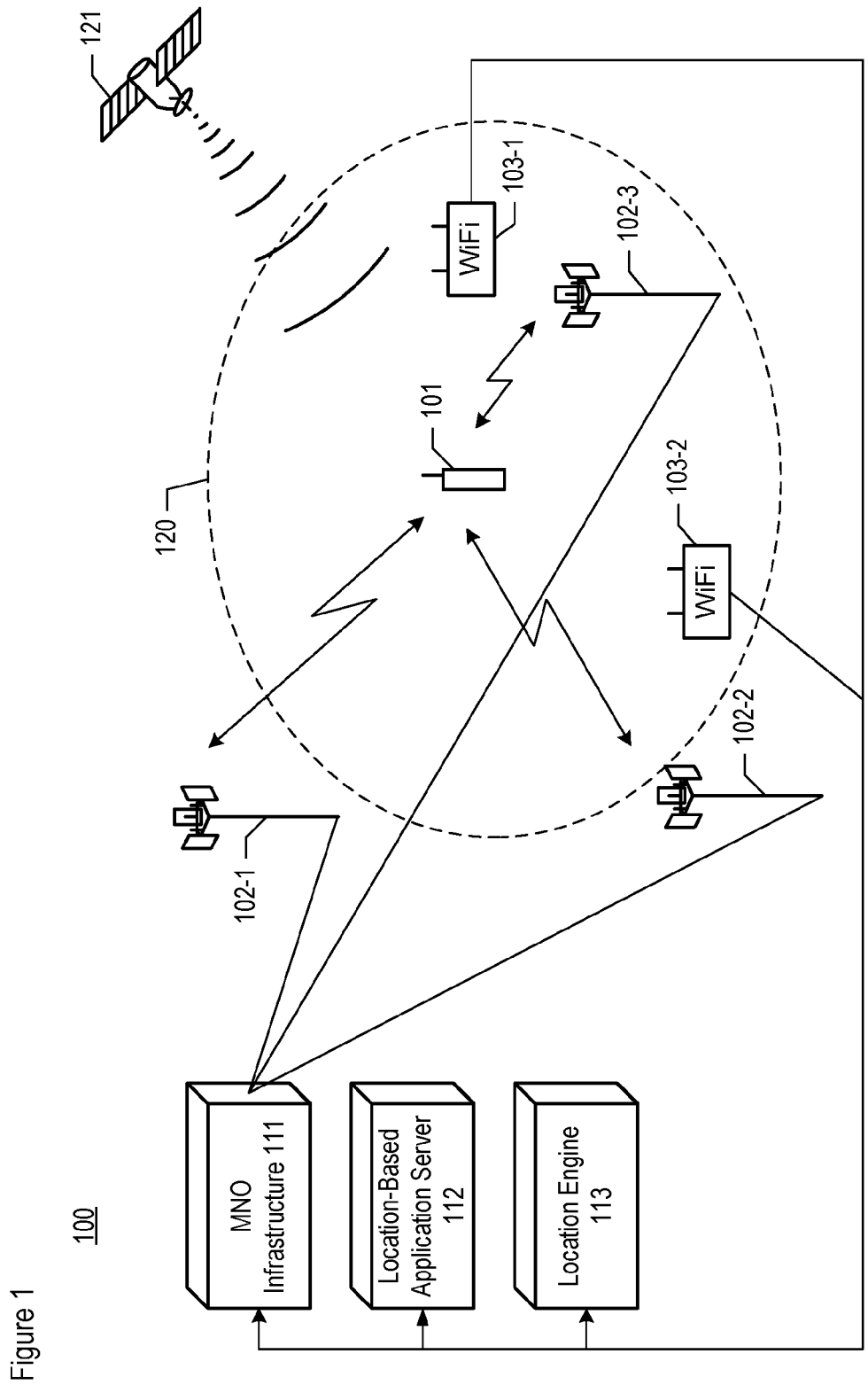
FIG. 1 depicts a diagram of the salient components of wireless telecommunications system 100 in accordance with the illustrative embodiment of the present invention.

"App"—For the purposes of this specification, the phrase "app" is an application downloaded to and executed by a wireless terminal or other mobile device.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Deduce—For the purposes of this specification, the infinitive "to deduce" and its inflected forms (e.g., "deducing", "deduced", etc.) should be given the ordinary and customary meaning that the terms would have to a person of ordinary skill in the art at the time of the invention.

Estimate—For the purposes of this specification, the infinitive "to estimate" and its inflected forms (e.g., "estimating", "estimated", etc.) should be given the ordinary and customary meaning that the terms would have to a person of ordinary skill in the art at the time of the invention.

Estimate of the Probability that the Wireless Terminal is Indoors—For the purposes of this specification, an "estimate of the probability that the wireless terminal is indoors" is defined as the complement of an estimate of the probability that the wireless terminal is outdoors (i.e., P(indoors)=1−P(outdoors)).

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Identity of a Radio Signal—For the purposes of this specification, the phrase "identity of a radio signal" is defined as one or more indicia that distinguish one radio signal from another radio signal. Cell ID is an example of an identity of a radio signal.

Location—For the purposes of this specification, the term "location" is defined as a zero-dimensional point, a finite one-dimensional path segment, a finite two-dimensional surface area, or a finite three-dimensional volume.

Location-Dependent Trait of a Radio Signal—For the purposes of this specification, the term "location-dependent trait of a radio signal" is defined as a characteristic of a radio signal that varies with:
  i. the location of the transmitter of the signal, or
  ii. the location of the receiver of the signal, or
  iii. both i and ii.
For example and without limitation, the amplitude and phase of a radio signal are generally location-dependent traits of the signal. In contrast, the frequency of a radio signal is generally not a location-dependent trait of the signal.

Location-Trait Database—For the purposes of this specification, a "Location-Trait Database" is defined as a mapping that associates, at each of a plurality of locations:
  i. one or more location-dependent traits of one or more radio signals received or transmitted by a wireless terminal, or
  ii. the identity of one or more radio signals received or transmitted by a wireless terminal, or
  iii. both i and ii.

Metadata—For the purposes of this specification, "metadata" is defined data that describes other data. Metadata can be used to summarize basic information about data (e.g., start time of packet transmission, etc.), which can make finding and working with particular instances of data easier, and without revealing the specific content of the data itself (e.g., images conveyed by a packet transmission, etc.).

Mobile Network Operator—For the purposes of this specification, a "mobile network operator" (MNO) is defined as a provider of wireless communications services that owns or controls, or both, all of the elements necessary to sell and deliver services to an end user including radio spectrum allocation, wireless network infrastructure, back haul infrastructure, billing, customer care, provisioning computer systems and marketing and repair organizations. An MNO is also known as a wireless service provider, wireless carrier, cellular company, or mobile network carrier.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, a fixed or mobile subscriber unit, a pager, a cellular telephone, a personal digital assistant (PDA), a computer, and any other type of device, mobile or otherwise, capable of operating in a wireless environment are examples of wireless terminals.

FIG. 1 depicts a diagram of the salient components of wireless telecommunications system 100 in accordance with the illustrative embodiment of the present invention. Wireless telecommunications system 100 comprises: wireless terminal 101, cellular base stations 102-1, 102-2, and 102-3, Wi-Fi base stations 103-1 and 103-2, mobile network operator (MNO) infrastructure 111, location-based application server 112, location engine 113, and GPS constellation 121, interrelated as shown.

MNO infrastructure 111, location-based application server 112, location engine 113, cellular base stations 102-1, 102-2, and 102-3, and Wi-Fi base stations 103-1 and 103-2 are all connected to one or more interconnected computer networks (e.g., the Internet, a local-area network, a wide-area network, etc.) and, as such, can exchange data in well-known fashion. In some embodiments of the present invention, these elements within system 100 constitute a mobile network operator (MNO) telecommunications network. In some other embodiments, only some of these elements are part of a first MNO network (e.g., the cellular base stations and MNO infrastructure 111), while some other elements can be part of one or more other networks (e.g., WiFi base stations) that can be part of an MNO network or not.

Wireless terminal 101 comprises the hardware and software necessary to perform the processes described below and in the accompanying figures. Furthermore, wireless terminal 101 is mobile and can be at any location within geographic region 120 at any time. Wireless terminal 101 is capable of providing bi-directional voice, SMS text, data, and video telecommunications service to an end user (not shown). As those who are skilled in the art will appreciate after reading this disclosure, however, wireless terminal 101 can provide a different set of services in some embodiments of the present invention.

In particular, wireless terminal 101 is capable of receiving one or more radio signals from each of cellular base stations 102-1, 102-2, and 102-3, Wi-Fi base stations 103-1 and 103-2, and GPS constellation 121, in well-known fashion. Wireless terminal 101 is also capable of identifying each radio signal it receives, in well-known fashion, and of transmitting the identity of each signal it receives to location engine 113. Wireless terminal 101 is further capable of measuring one or more location-dependent traits of each radio signal it receives, in well-known fashion, and of transmitting each measurement it generates to equipment in the MNO network within system 100. And still furthermore, wireless terminal 101 is capable of measuring a difference of a location-dependent trait of two signals it receives, in well-known fashion, and of transmitting such measurements to equipment in the MNO network.

In accordance with the illustrative embodiment, wireless terminal 101 is capable of transmitting one or more radio signals—that can be received by one or more of cellular base stations 102-1, 102-2, and 102-3 and Wi-Fi base stations 103-1 and 103-2—in accordance with specific parameters (e.g., signal strength, frequency, coding, modulation, etc.), in well-known fashion, and of transmitting those parameters to equipment in the MNO network.

Although the illustrative embodiment depicts wireless telecommunications system 100 as comprising only one wireless terminal, it will be clear to those skilled in the art, after reading this disclosure, how to make and use alternative embodiments of the present invention that comprise any number of wireless terminals.

Cellular base stations 102-1, 102-2, and 102-3 communicate with MNO infrastructure 111 via wireline and with wireless terminal 101 via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, cellular base stations 102-1, 102-2, and 102-3 are terrestrial, immobile, and base station 102-3 is within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 102-1, 102-2, and 102-3 comprise the hardware and software necessary to be 3GPP-compliant (3$^{rd}$ Generation Partnership Project—compliant) and to perform the processes described below and in the accompanying figures. For example and without limitation, each of cellular base stations 102-1, 102-2, and 102-3 are capable of continually:
 i. receiving one or more radio signals transmitted by wireless terminal 101, and
 ii. identifying each radio signal transmitted by wireless terminal 101, in well-known fashion, and of transmitting the identity of those signals to location engine 113 via MNO infrastructure 111, and
 iii. measuring one or more location-dependent traits of each radio signal transmitted by wireless terminal 101, in well-known fashion, and of transmitting the measurements to location engine 113 via MNO infrastructure 111, and
 iv. transmitting one or more signals to wireless terminal 101 in accordance with specific parameters (e.g., signal strength, frequency, coding, modulation, etc.), in well-known fashion, and of transmitting those parameters to location engine 113 via MNO infrastructure 111.

As described above, the cellular base stations provide cellular telecommunications service to wireless terminal 101 in accordance with a 3GPP-compliant set of protocols. Such protocols include, but are not limited to, Global System for Mobile Communications (GSM), Universal Mobile Telecommunications System (UMTS), Long Term Evolution (LTE), CDMA-2000, IS-136 TDMA, IS-95 CDMA, 3G Wideband CDMA, and so on. In some alternative embodiments, the cellular base stations provide cellular service via a different set of protocols.

Wi-Fi base stations 103-1 and 103-2 communicate with wireless terminal 101 via radio in well-known fashion. Wi-Fi base stations 103-1 and 103-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 103-1 and 103-2 are capable of continually:
 i. receiving one or more radio signals transmitted by wireless terminal 101, and
 ii. identifying each radio signal transmitted by wireless terminal 101, in well-known fashion, and of transmitting the identity of those signals to location engine 113, and
 iii. measuring one or more location-dependent traits of each radio signal transmitted by wireless terminal 101, in well-known fashion, and of transmitting the measurements to location engine 113, and
 iv. transmitting one or more signals to wireless terminal 101 in accordance with specific parameters (e.g., signal strength, frequency, coding, modulation, etc.), in well-known fashion, and of transmitting those parameters to location engine 113.

Each WiFi base station comprises the hardware and software necessary to be WiFi-compliant and to perform the related processes described below and in the accompanying figures. After reading this disclosure, it will be clear to those skilled in the art how to make and use alternative embodiments of the present invention that operate in accordance with one or more other computer network standards (e.g., IEEE 802.16 WiMax, Bluetooth, LoRa, etc.) in one or more frequency bands, including, but not limited to, personal area network (PAN) standards and local area network (LAN) standards.

In accordance with the illustrative embodiment, the wireless terminals throughout region 120 and the base stations within telecommunications system 100 transmit packets of data to each other wirelessly, which packets convey the information associated with the aforementioned services provided. The packets themselves are conveyed via at least some of the radio signals described above.

MNO infrastructure 111 comprises a switch that orchestrates the provisioning of telecommunications service to wireless terminal 101 and the flow of information to and from location engine 113, as described below and in the accompanying figures. As is well known to those skilled in the art, wireless switches are also commonly referred to by other names such as mobile switching centers, mobile telephone switching offices, routers, etc.

MNO infrastructure 111 maintains data on each of its subscribers (i.e., end users for which the MNO is the home network) and on end users in general (e.g., users that are visiting region 120 and are not in their home network, etc.). Furthermore, MNO infrastructure 111 makes available at least metadata that describes the end-user data being maintained, without providing any explicit identification (e.g., name, address, etc.) of a given end user and without providing the substantive content itself of any communication by the end user. In particular, MNO infrastructure 111 makes available metadata that describes packet-level communications between the MNO's telecommunications network within system 100 and one or more wireless terminals 101.

In some embodiments, the metadata referred to herein is contained within one or more call detail records (CDR), as are known in the art. A CDR is a data record produced by a telecommunications equipment component that documents the details of a telephone call or other communications transaction, comprising a set of one or more of the packet-level transmissions discussed herein, that passes through that component. The record can contain various attributes of the communications transaction such as, while not being limited to, at least some of the metadata examples described elsewhere in this specification.

Location-based application server 112 comprises hardware and software that can use the estimate of the location of wireless terminal 101—generated by location engine 113—in a location-based application, in well-known fashion. Location-based applications are well-known in the art and provide services such as, and without limitation, E-911 routing, navigation, location-based advertising, weather alerts.

Location engine 113 is a data processing system that comprises hardware and software that i) estimates whether wireless terminal 101 (and, by association, the terminal's user) is indoors or outdoors and ii) generates one or more estimates of the location of the wireless terminal, as described below and in the accompanying figures. It will be clear to those skilled in the art, after reading this disclosure, how to make and use location engine 113. Furthermore, although location engine 113 is depicted in FIG. 2 as being physically distinct from MNO infrastructure 111, it will be clear to those skilled in the art, after reading this disclosure, how to make and use alternative embodiments of the present invention in which location engine 113 is wholly or partially integrated into MNO infrastructure 111.

Figure 2:
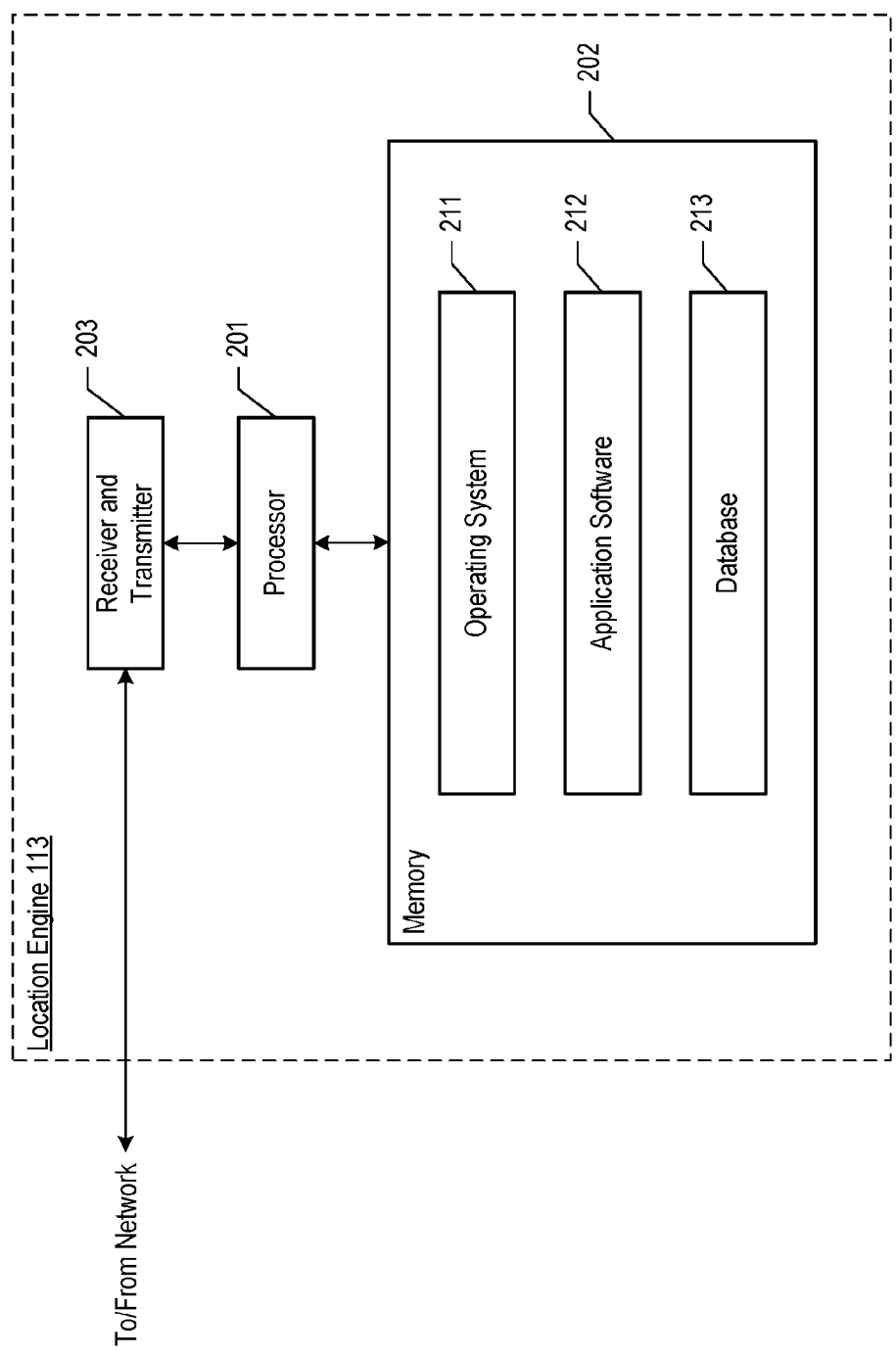
FIG. 2 depicts a block diagram of the salient components of location engine 113 of system 100.

Location engine 113—FIG. 2 depicts a block diagram of the salient components of location engine 113 in accordance with the illustrative embodiment. Location engine 113, as a computer system, comprises: processor 201, memory 202, and receiver and transmitter 203, which are interconnected as shown.

Figure 4:
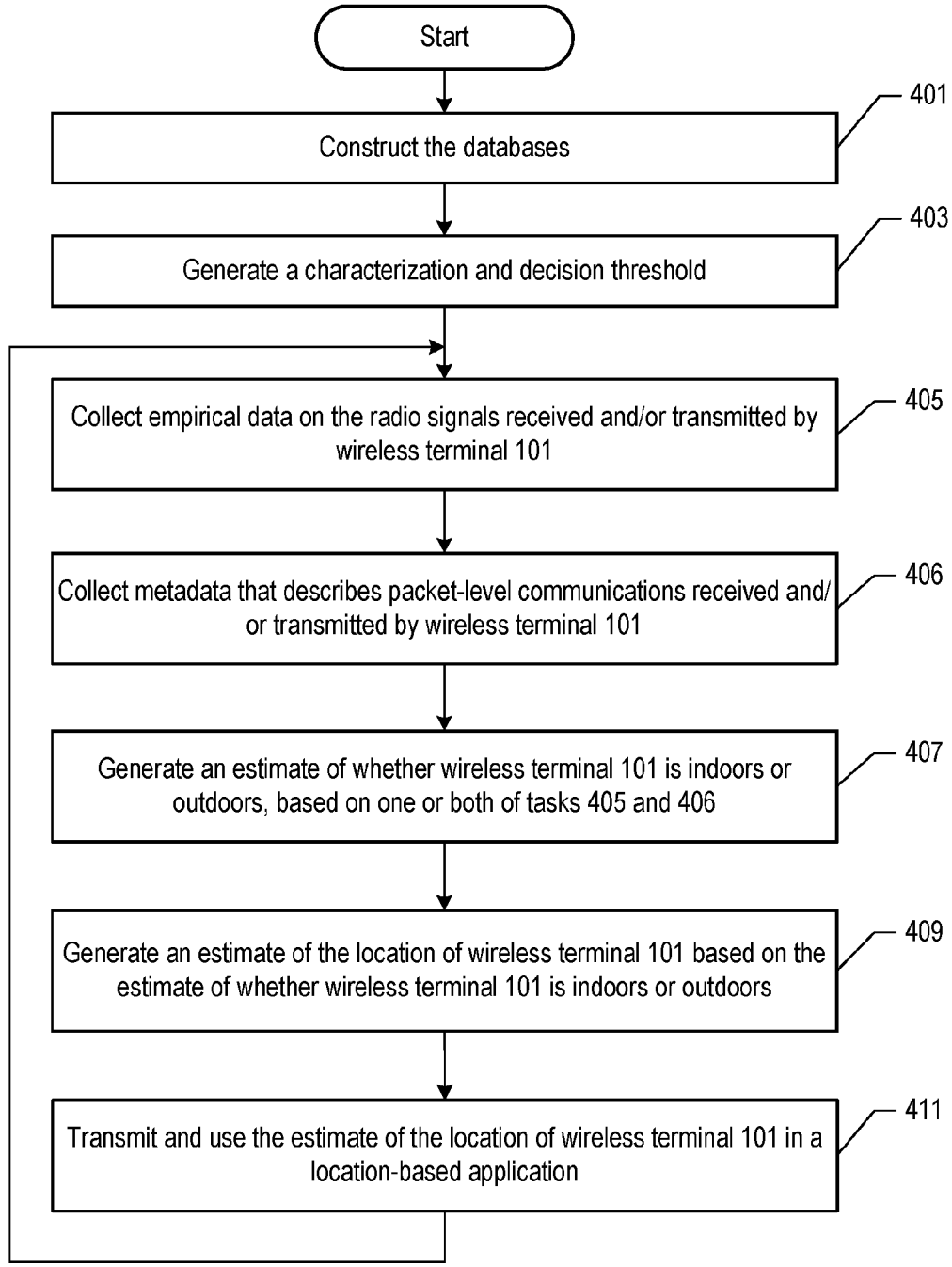
FIG. 4 depicts a flowchart of the salient processes performed in accordance with the illustrative embodiment of the present invention.

Processor 201 is a general-purpose processor that is configured to execute an operating system and the application software that performs the operations described herein, including the operations described in FIG. 4 and other figures. Processor 201 is also capable of populating, amending, using, and managing a location-trait database and a geographic information system (GIS) database, and of using one or more classification features as described herein. It will be clear to those skilled in the art, after reading this specification, how to make and use processor 201.

In general, the location-trait database contains information for the possible locations of wireless terminal 101 and the identity and location-dependent traits of radio signals as if wireless terminal 101 were at each of those locations. In some embodiments, the location-trait database is a database of maps (e.g., those that are described above and in FIG. 3, etc.) that associate each of a plurality of locations to one or more predicted traits associated with a wireless terminal at that location.

In general, the GIS database contains information for geographic region 120, including without limitation, the physical characteristics of all of the structures (e.g., buildings, etc.) in geographic region 120.

Memory 202 is non-transitory and non-volatile computer storage memory that is configured to store:
  i. operating system 211, and
  ii. application software 212, and
  iii. database 213, comprising the location-trait database and GIS database, information related to one or more classification features, and metadata information.

It will be clear to those skilled in the art, after reading this specification, how to make and use memory 202.

Receiver and transmitter 203 is configured to enable location engine 113 to receive from and transmit to MNO infrastructure 111, location-based application server 112, and Wi-Fi base stations 103-1 and 103-2, in well-known fashion. In some embodiments of the present invention, the receiver and transmitter are configured to enable the location engine to receive from and transmit to wireless terminal 101 directly. It will be clear to those skilled in the art, after reading this specification, how to make and use receiver and transmitter 203.

In accordance with the illustrative embodiment, location engine 113 comprises one or more server computers that perform at least some of the tasks disclosed herein. As those who are skilled in the art will appreciate after reading this specification, however, location engine 113 can be a different type of apparatus than a server computer, and can be referred to by a different name such as a data-processing system, a computer system, a computing device, or another type of hardware platform that comprises one or more processors, one or more memories, and one or more network interfaces, for example and without limitation.

Furthermore, as those who are skilled in the art will appreciate after reading this specification, the hardware platform performing at least some of the tasks performed by location engine 113 can be embodied as a multi-processor platform, as a sub-component of a larger computing platform, as a virtual computing element, or in some other computing environment—all within the scope of the present invention.

Figure 3:
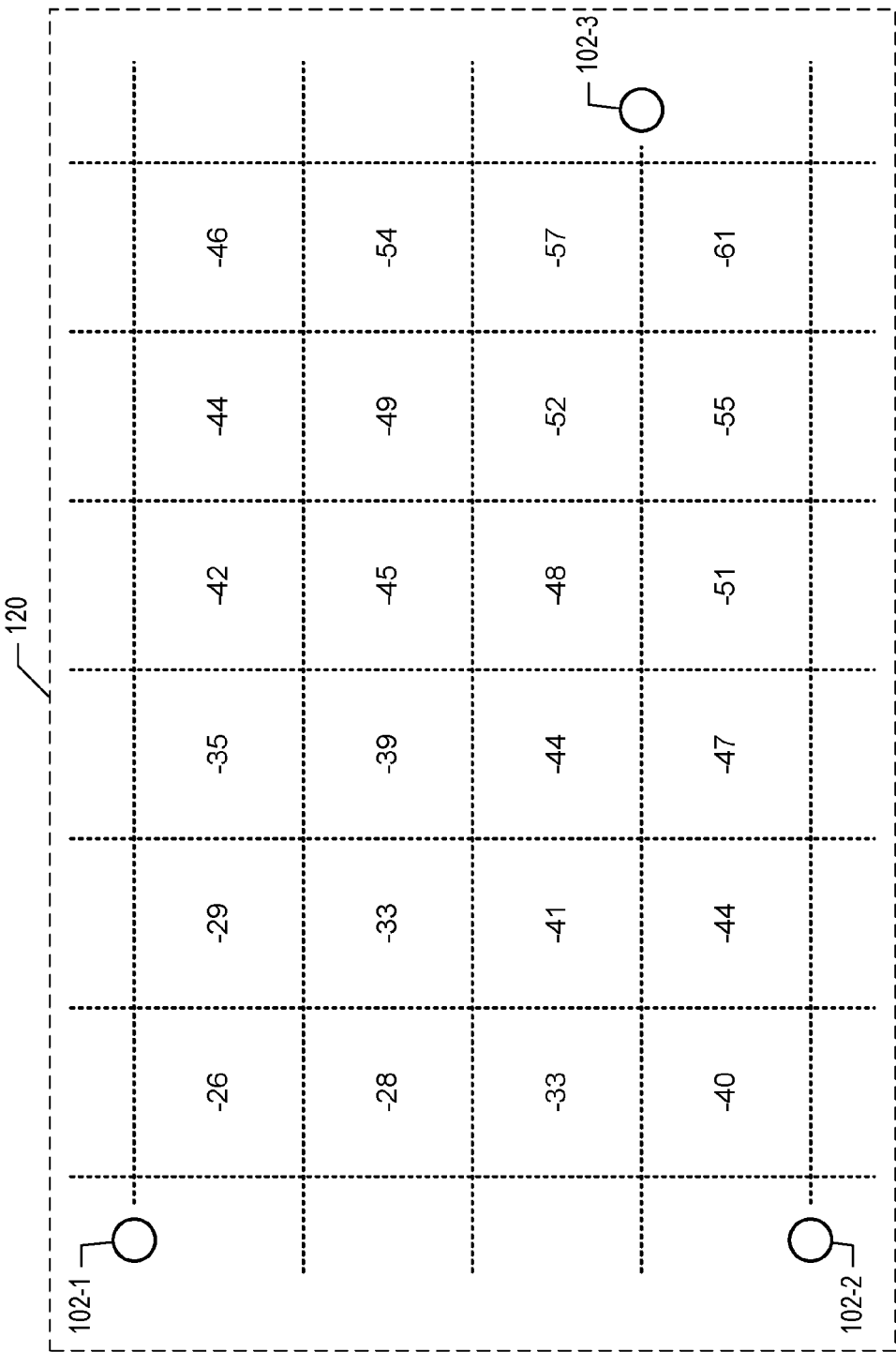
FIG. 3 depicts a radio frequency (RF) map that represents a partitioning of geographic region 120 of system 100 into 24 square locations.

Radio Frequency Map of the Illustrative Embodiment—FIG. 3 depicts a radio frequency (RF) map that represents a partitioning of geographic region 120 into 24 square locations. The maps are maintained as part of the location-trait database, which is situated at location engine 113. In general, the map associates:
  i. a plurality of possible locations of wireless terminal 101, with
  ii. a predicted value of a location-dependent trait for each of the possible locations.

In other words, when wireless terminal 101 is at an unknown location, an empirical measurement of the location-dependent trait is a "fingerprint" or "signature" that can be used, in conjunction with the map, to estimate the location of the wireless terminal.

In accordance with the illustrative embodiment of the present invention, the location-dependent trait is the received signal strength as measured in dBm, and each map associates each possible location of wireless terminal 101 with the predicted received signal strength of one signal as transmitted from an antenna of a particular base station—in this case, base station 102-1—and as a function of the calendrical time, T, and the environmental conditions, N. With this in mind, FIG. 3 indicates the mapping of the signal radiated by the antenna of base station 102-1 at Noon on a sunny day. Each of the base station 102-2 and 102-3 antennas similarly has a map that associates each possible location of wireless terminal 101 with the predicted received signal strength of one signal as transmitted from the antenna of the particular base station. How each map is generated is described below and in FIG. 5.

It will, however, be clear to those skilled in the art, after reading this specification, how to make and use alternative embodiments of the present invention in which one or more of the following predicted traits are used, instead of or in addition to the trait of received signal strength:
  i. the predicted pathloss of all of the signals receivable by wireless terminal 101 when wireless terminal 101 is at the location, from all transmitters (e.g., base stations 102-1 through 102-3, commercial television, commercial radio, navigation, ground-based aviation, etc.), as a function of the calendrical time, T, and the environmental conditions, N; and ii. the predicted pathloss of all of the signals transmitted by wireless terminal 101 when wireless terminal 101 is in the location as receivable at base stations 102-1 through 102-3, as a function of the calendrical time, T, and the environmental conditions, N; and iii. the predicted received signal strength of all of the signals transmitted by wireless terminal 101 when wireless terminal 101 is in the location as receivable at base stations 102-1 through 102-3, as a function of the calendrical time, T, and the environmental conditions, N; and iv. the predicted received signal-to-impairment ratio (e.g., Eb/No, etc.) of all of the signals receivable by wireless terminal 101 when wireless terminal 101 is in the location, from all transmitters, as a function of the calendrical time, T, and the environmental conditions, N; and v. the predicted received signal-to-impairment ratio of all of the signals transmitted by wireless terminal 101 when wireless terminal 101 is in the location as receivable at base stations 102-1 through 102-3, as a function of the calendrical time, T, and the environmental conditions, N; and vi. the predicted received temporal difference of each pair of multipath components (e.g., one temporal difference for one pair of multipath components, a pair of temporal differences for a triplet of multipath components, etc.) of all of the signals receivable by wireless terminal 101 when wireless terminal 101 is in the location, from all transmitters, as a function of the calendrical time, T, and the environmental conditions, N; and vii. the predicted received temporal difference of each pair of multipath components (e.g., one temporal difference for one pair of multipath components, a pair of temporal differences for a triplet of multipath components, etc.) of all of the signals transmitted by wireless terminal 101 when wireless terminal 101 is in the location as receivable at base stations 102-1 through 102-3, as a function of the calendrical time, T, and the environmental conditions, N; and viii. the predicted received delay spread (e.g., RMS delay spread, excess delay spread, mean excess delay spread, etc.) of all of the signals receivable by wireless terminal 101 when wireless terminal 101 is in the location, from all transmitters, as a function of the calendrical time, T, and the environmental conditions, N; and ix. the predicted received delay spread (e.g., RMS delay spread, excess delay spread, mean excess delay spread, etc.) of all of the signals transmitted by wireless terminal 101 when wireless terminal 101 is in the location as receivable at base stations 102-1 through 102-3, as a function of the calendrical time, T, and the environmental conditions, N; and x. the predicted received relative arrival times of two or more multipath components of all of the signals receivable by wireless terminal 101 when wireless terminal 101 is in the location, from all transmitters (which can be determined by a rake receiver in well-known fashion), as a function of the calendrical time, T, and the environmental conditions, N; and xi. the predicted received relative arrival times of two or more multipath components of all of the signals transmitted by wireless terminal 101 when wireless terminal 101 is in the location as receivable at base stations 102-1 through 102-3, as a function of the calendrical time, T, and the environmental conditions, N; and xii. the predicted round-trip time of all of the signals transmitted and receivable by wireless terminal 101 through base stations 102-1, 102-2, and 102-3, as a function of the calendrical time, T, and the environmental conditions, N; and xiii. the predicted round-trip time of all of the signals transmitted and receivable by base stations 102-1, 102-2, and 102-3 through wireless terminal 101, as a function of the calendrical time, T, and the environmental conditions, N; and xiv. the identity of the base stations that provide telecommunications service to the location, as a function of the calendrical time, T, and the environmental conditions, N; and xv. the identities of the neighboring base stations that provide telecommunications service to the location, as a function of the calendrical time, T, and the environmental conditions, N; and xvi. the handover state (e.g., soft, softer, 1x, 2x, etc.) of wireless terminal 101 and wireless telecommunication system 100 when wireless terminal 101 is in the location as a function of the calendrical time, T, and the environmental conditions, N.

Operation of the Illustrative Embodiment—FIG. 4 depicts a flowchart of the salient processes performed in accordance with the illustrative embodiment of the present invention. The tasks described below can be used to estimate the location of a predetermined wireless terminal.

The processes performed by wireless telecommunications system 100 of the illustrative embodiment are depicted in the drawings (i.e., FIG. 4 and subsequent figures) as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted processes might be combined or performed by different devices. In some embodiments of the present invention, some of the depicted processes might be omitted.

At task 401, the location-trait database and the GIS database are constructed and stored in memory 202 of location engine 113. Task 401 is described in detail below and in FIG. 5.

At task 403, a characterization that is a composite of one or more classification features is generated, for a given combination of classification features, and stored in memory 202 of location engine 113. In this sense, a "feature" is an individual measurable heuristic property of a phenomenon being observed and can be regarded as an explanatory variable, as is known in the art. Task 403 is described below and in FIG. 6.

In accordance with the illustrative embodiment of the present invention, a solution vector represents the characterization. The solution vector represents how a given combination of features interact to determine when wireless terminal 101 classified as being indoors versus outdoors, when the solution vector and a decision threshold are applied to empirical data that are representative of the wireless terminal.

At task 405, location engine 113 collects empirical data on the radio signals received and transmitted by wireless terminal 101. Task 405 is described in detail below and in FIG. 9.

At task 406, location engine 113 collects metadata that describes packet-level communications received and transmitted by wireless terminal 101. Task 405 is described in detail below and in FIG. 10.

At task 407, location engine 113 generates an estimate of whether wireless terminal 101 is indoors or outdoors, based on one or both of tasks 405 and 406. Task 407 is described in detail below and in FIG. 11.

At task 409, location engine 113 generates an estimate of the location of wireless terminal 101 based on, among other things, the estimate of whether the wireless terminal is indoors or outdoors. Task 409 is described in detail below and in FIG. 12.

At task 411, location engine 113 transmits the estimate of the location of wireless terminal 101 generated at task 409 to location-based application server 112 and/or to wireless terminal 101 for use in a location-based application. In some embodiments of the present invention, location engine 113 transmits the estimate to a different computer system, either for use in a location-based application or for a different use. In some embodiments of the present invention, location engine 113 transmits an indication of whether wireless terminal 101 is determined to be indoors or outdoors (e.g., a probability value, value="indoors", value="outdoors", etc.), based on the estimate that is generated as described below and in task 407. It will be clear to those skilled in the art how to enable embodiments of the present invention to perform task 411. After task 411 is completed, control passes back to task 405.

Figure 5:
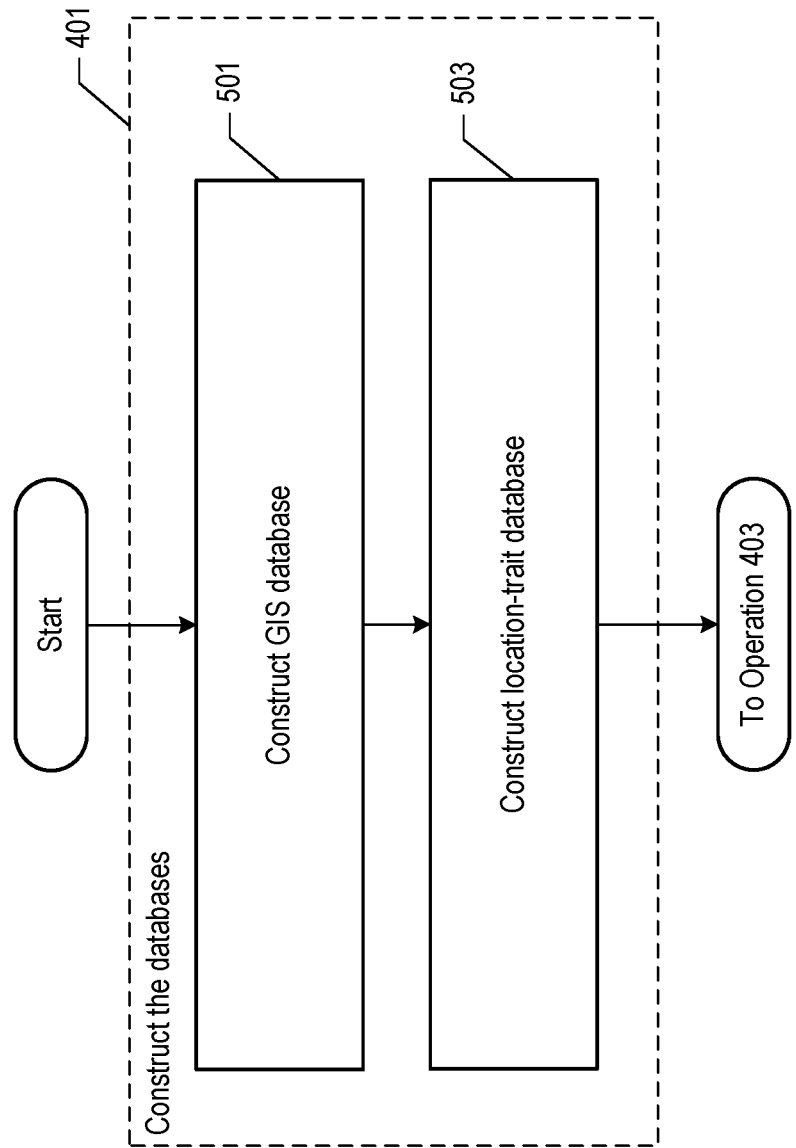
FIG. 5 depicts a flowchart of the salient processes performed in accordance with task 401.

Task 401: Construct the GIS Database and the Location-Trait Database—FIG. 5 depicts a flowchart of the salient processes performed in accordance with task 401.

At task 501, the GIS database is constructed and stored in memory 202 of location engine 113. It will be clear to those skilled in the art how to accomplish task 501.

At task 503, the location-trait database is constructed and stored into memory 202 of location engine 113. As part of task 503, the identity of—and location-dependent traits for—each radio signal that each of cellular base stations 102-1, 102-2, and 102-3, Wi-Fi base stations 103-1 and 103-2 is expected to be able to receive from wireless terminal 101, for each possible location of wireless terminal 101, is determined in well-known fashion.

It will be clear to those skilled in the art how to accomplish task 503, and in accordance with the illustrative embodiment, this is accomplished through a combination of "drive testing" (i.e., empirical data gathering) and radio-frequency propagation modeling. See for example and without limitation, U.S. Patent Application Publications 2008/0077356, 2008/0077472, and 2008/0077516, which are incorporated by reference herein.

Figure 6:
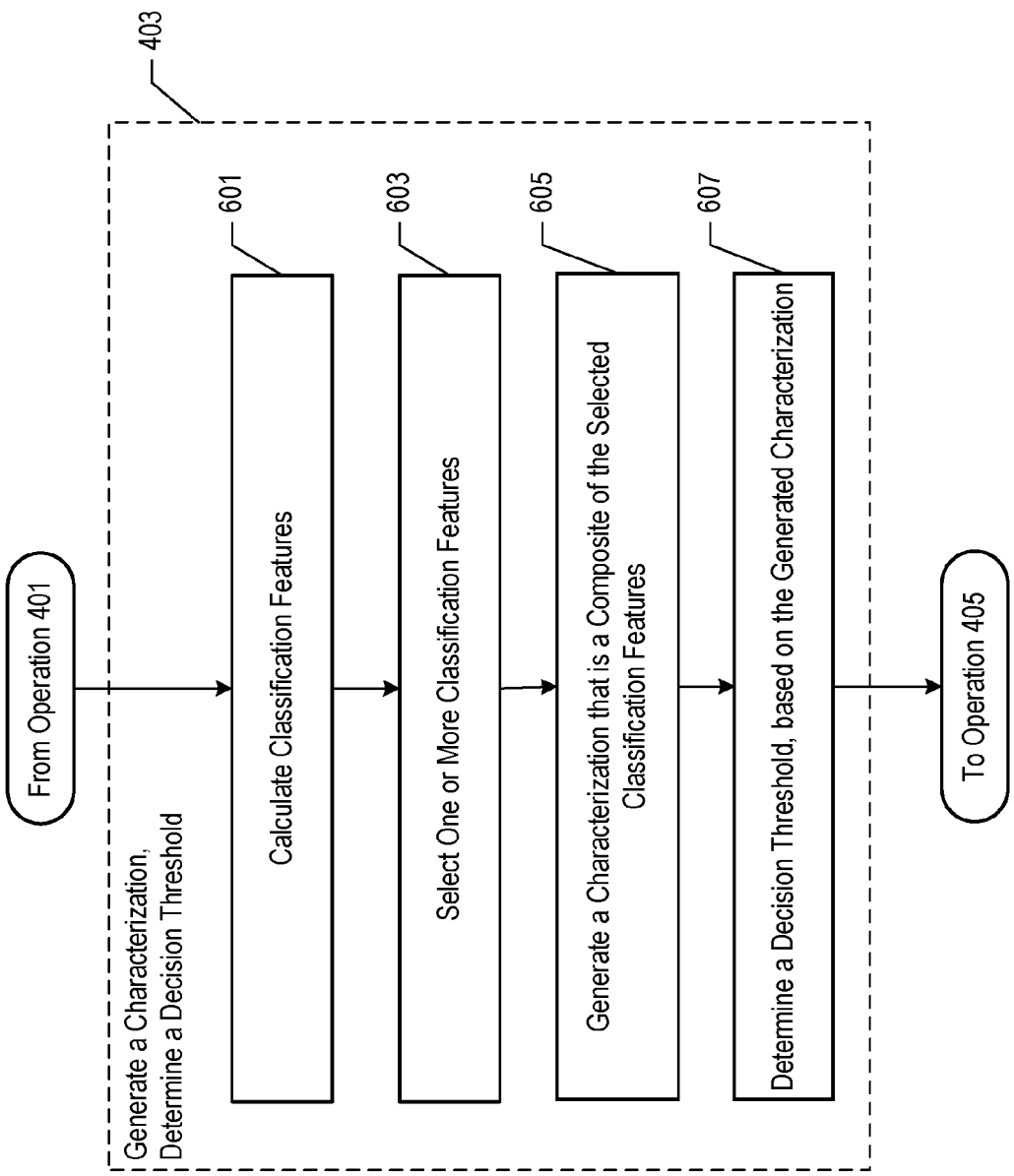
FIG. 6 depicts a flowchart of the salient processes performed in accordance with task 403.

Task 403: Generate a Characterization, Determine a Decision Threshold—FIG. 6 depicts a flowchart of the salient processes performed in accordance with task 403.

At task 601, one or more classification features are calculated and stored into memory 202 of location engine 113, based on packet-level transmissions occurring over a predetermined interval. In accordance with the illustrative embodiment, the data comprises metadata that describes packet-level communications between an equipment component (e.g., MNO infrastructure 111) within an MNO telecommunications network and one or more wireless terminals (e.g., terminal 101). Each classification feature characterizes a location-dependent trait, at least to the extent that a wireless terminal can be classified as being at an indoor location or at an outdoor location. For example and without limitation, the metadata can suggest usage of one or more particular software apps being executed by wireless terminal 101; location engine 113 can use the deduced usage of these software applications, with or without other evidence of location (e.g., traits measured by terminal 101, etc.), to estimate whether the terminal is indoors or outdoors.

In some embodiments of the present invention, the data can also comprise measurements of radio signals received by a plurality of wireless terminals over time and/or the identities of those radio signals, and then acquired (e.g., via network measurement reports, etc.) and collected in the network over time. In such embodiments, a classification feature can characterize a location-dependent trait such as signal strength, for example and without limitation, at least to the extent that a wireless terminal can be classified as being at an indoor location or at an outdoor location. Such a location-dependent trait can be directly measurable by a wireless terminal and/or by a base station, while in some other embodiments it is not directly measurable.

In some embodiments of the present invention, each classification feature is calculated as a single value per non-empty set of packet-level transmissions (e.g., for a single communication transaction, for multiple transactions, etc.). A characterization of a classification feature across the aggregation of transmissions in a data set can be represented as a histogram, as a cumulative distribution function (CDF), or as another suitable description, for example and without limitation.

A first category of classification features can be used for estimating whether wireless terminal is indoors or outdoors, from the metadata that describes packet-level communications. In accordance with the illustrative embodiment, various types of metadata can be made available to location engine 113 that describes patterns associated with one or more end users, of one or more wireless terminals. FIG. 7 depicts non-limiting excerpt 700 of a metadata collection, which comprises, for each packet-level communication between infrastructure 111 and terminal 101:

i. the start time (or arrival time) of the communication,
 ii. the end time of the communication,
 iii. the type of service (e.g., GPRS, SMS, telephony, etc.),
 iv. whether the communication is incoming or outgoing,
 v. the longitude and latitude of the serving cell tower,
 vi. the azimuth of the serving sector of the cell,
 vii. the serving cell (i.e., "Cell_ID_A"), and
 viii. a neighbor cell (i.e., "Cell_ID_B").

As those who are skill in the art will appreciate, after reading this specification, any one of the foregoing features can be used as a classification feature either insolation or in combination with other features. Moreover, in some embodiments, restrictions can be placed on the usage of certain features without others; for example, location engine 113 might select any position-oriented features (e.g., longitude, latitude, etc.) for analysis only as a means to improve the accuracy of a different feature.

As those who are skill in the art will appreciate, after reading this specification, one or more other types of data can be made available and used from historical data at the packet level, in addition to or as an alternative to the data types listed above. Moreover, additional features can be derived from the collected metadata. For example and without limitation, the packet-level features of size of packets and inter-arrival times of packets can be made available as well.

In addition to features made available and used at the packet level, location engine 113 can use features at the flow level and/or session level. A flow is defined as a unidirectional sequence of packets that have some common property, typically the source IP address, destination IP address, source port, destination port, and/or IP protocol type. Examples of flow-level features include the distributions of durations, data volumes (e.g., flow sizes), and packet numbers of flows. Session features (e.g., session sizes) can be used to consider characteristics across multiple flows that make up a session.

In order to determine whether a classification feature is usable for directly estimating a terminal's indoor/outdoor status, an empirical study can be made on each feature (e.g., inter-arrival time, etc.) or combination of features to determine whether the feature or features are probative of such status.

A second category of classification features can be used for estimating whether wireless terminal 101 is indoors or outdoors based on determining which app or apps are being used by an end user of wireless terminal 101, and in what way. Typically, privacy concerns keep the exact usage of apps on the part of a particular end user from being made available. Thus, location engine 113 must deduce the usage of the one or more apps from the metadata such as that of collection 700, in accordance with the illustrative embodiment. Then, as a subsequent step, location engine 113 can then estimate whether wireless terminal 101 is indoors or outdoors, based on the deduced app usage.

A classification feature for at least differentiating between device applications has been suggested. For example, the publication "Understanding the Characteristics of Cellular Data Traffic," by Y. Zhang and A. Arvidsson, CellNet'12, Aug. 13, 2012, Helsinki, Finland, incorporated by reference herein, identifies differences across device apps at a packet level and based on the average packet inter-arrival times, defined as the average time between each arrival into the system and the next.

A classification feature for deducing a device app or apps being used, as described above, can then be further combined with another classification feature for estimating whether wireless terminal is indoors or outdoors based on the deduced app or apps. An empirical study can be made on each feature, or combination of features, to determine whether the feature or features are probative of whether the terminal is indoors or outdoors. For example and without limitation, a study, empirical or otherwise, might lead to a conclusion that the following apps or types of apps tend to be used indoors:
  i. productivity (e.g., word processing, spreadsheet, presentation, calculator, dictionary/thesaurus, etc.),
  ii. weather,
  iii. food preparation,
  iv. wine selection,
  v. scanner (e.g., barcode reader, QR code reader, etc.),
  vi. printer,
  vii. book reader,
  viii. indoor sports-oriented.

Similarly, a study might lead to a conclusion that the following apps or types of apps tend to be used outdoors, for example and without limitation:
  i. navigation,
  ii. traffic,
  iii. nearby points of interest,
  iv. celestial guides,
  v. outdoor sports-oriented.

Moreover, the particular combination of apps used by an end user over a particular time interval might suggest that the end user is indoors (e.g., weather app AND traffic app, etc.), or while a different combination of apps might suggest that the end user is outdoors (e.g., book reader app AND points-of-interest app, etc.). Additionally, additional characteristics that are independent of the end user and wireless terminal (e.g., time of day, weather forecast, etc.) might influence (e.g., by providing context, etc.) whether a particular app or combination of apps suggests that the end user is indoors or outdoors.

As those who are skilled in the art will appreciate after reading this specification, different sets of device apps can be associated with indoor usage and/or outdoor usage.

Any of the aforementioned features can be combined with one or more other features, in order to feature refine the estimation of whether a wireless terminal is indoors or outdoors. For example and without limitation, the browsing pattern of the end user when using a particular app can suggest indoor or outdoor status; sporadic usage might result from the user who is driving a car—and consequently outdoors—picking up the terminal when stopped and putting it down when moving. Additionally, patterns of push-based versus pull-based content can provide additional evidence.

At task 603, location engine 113 selects one or more classification features to be used in determining whether wireless terminal 101 is indoors or outdoors, as already alluded to. In some embodiments of the present invention, a combination of two or more classification features yields improved results over each constituent feature by itself, provided that the calculated measures of the classification features are not highly correlated with respect to one another.

In some embodiments of the present invention, a classification feature that is used to determine a particular app being used can be combined with one or more classification features that are oriented towards making use of signal measurements made by wireless terminal 101 and/or by one or more base stations. For example, U.S. Pat. No. 9,332,389, issued on May 3, 2016, incorporated by reference herein, provides examples of such signal measurement-based features.

At task 605, a characterization that is a composite of the selected classification features is generated and stored into memory 202 of location engine 113. The characterization and/or composite accounts for the selected features, or for various aspects of those features, as described below. In accordance with the illustrative embodiment, a solution vector is generated that is representative of the characterization. An often used method to fit data to known outcomes is linear least-squares (LLS). It only requires the computation of a pseudo-inverse, for example using singular value decomposition (SVD). In its purest form there are no parameters to tune. Since the indoor/outdoor classification problem has binary outcomes, the problem can be posed as $$x = \operatorname*{argmin}_{x} \|Ax - b\|_2^2, A \in R^{n \times m}, b \in R^n, x \in R^m. \quad \text{(Eq. 1)}$$

In the foregoing equation, A is the matrix with the classification feature values, in which each call or other type of communication transaction is a row, each feature a column, and b is the vector of zeros and ones, where an indoor call is set to one, and an outdoor call to zero. To accommodate a bias in the feature values, the first column of A is set to all ones. The dimension n is the number of calls, and m is the number of features plus one (bias). The solution vector x can be computed by $$x = A^\dagger b, \quad \text{(Eq. 2)}$$

where $(\bullet)^{\dagger}$ denotes the pseudo-inverse.

In some embodiments of the present invention, another type of classifier can be used such as, but not limited to, linear programming-based classification, a classification or decision tree, econometric modeling-based classification, and so on.

Figure 8:
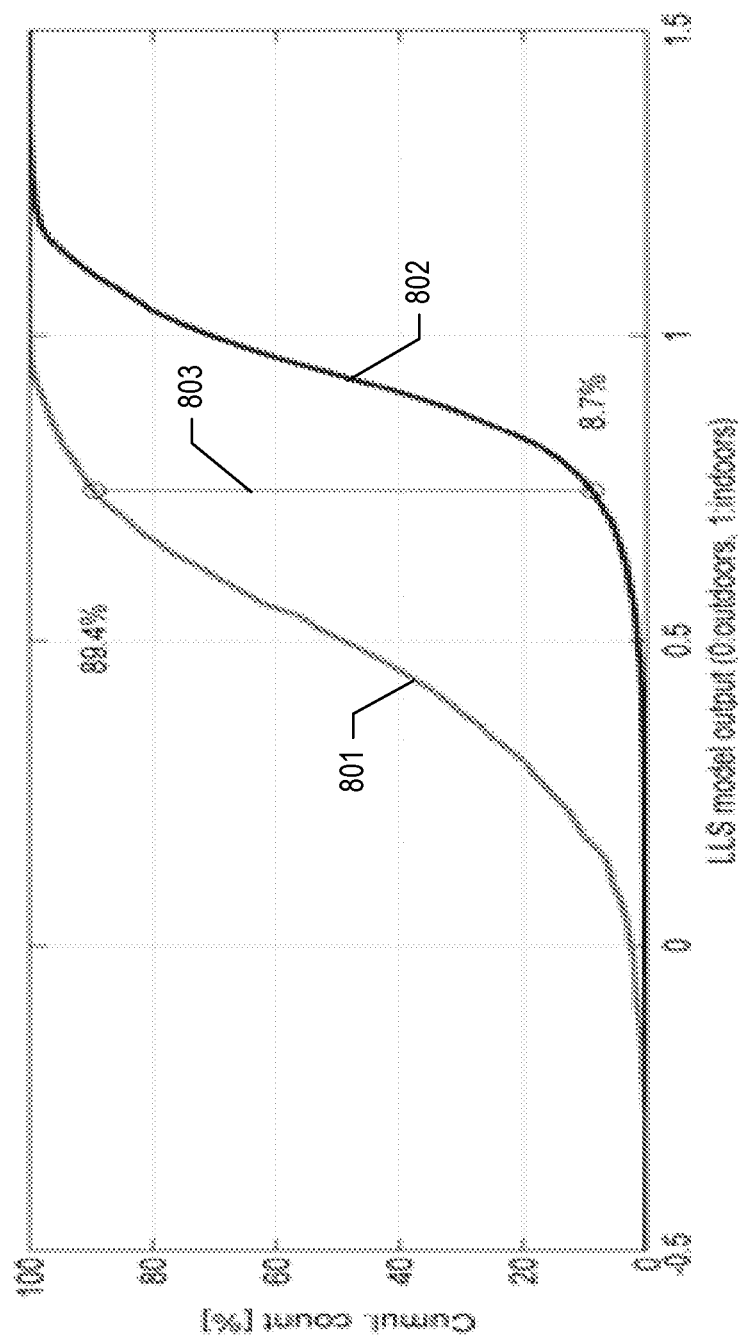
FIG. 8 depicts cumulative distribution functions of outdoor calls and indoor calls.

At task 607, a decision threshold $T_D$ is determined based on the generated solution matrix. An optimal threshold can be determined by looking at the cumulative distribution function (CDF) of Ax for indoor and outdoor calls, and finding the largest gap, as depicted in FIG. 8. In FIG. 8, CDF 801 is a cumulative distribution function of outdoor calls, and CDF 802 is a cumulative distribution function of indoor calls. Gap 803 represents the largest gap between CDFs 801 and 803 and can be used to determine the decision threshold.

In some other embodiments of the present invention, a different decision threshold can be determined, for example and without limitation by shifting the threshold it is possible to trade-off false positives against false negatives, but at the expense of a lower overall gap. It will be clear to those skilled in the art, after reading this specification, how to account for the relative orientation of indoor and outdoor data in the CDFs, in determining the threshold value.

Figure 9:
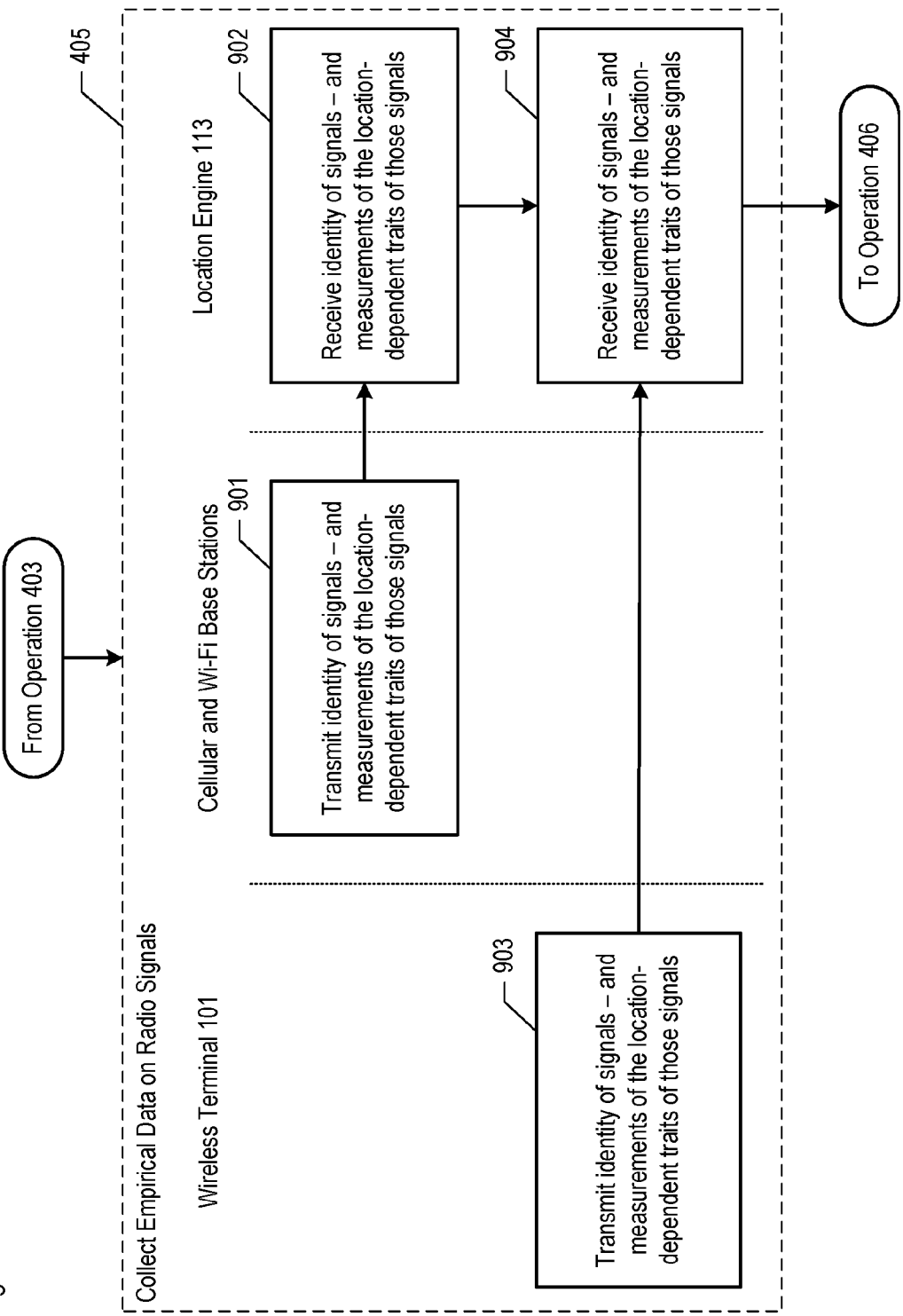
FIG. 9 depicts a flowchart of the salient processes performed in accordance with task 405.

Task 405: Collect Empirical Data on Radio Signals—FIG. 9 depicts a flowchart of the salient processes performed in accordance with task 405.

At task 901, each of cellular base stations 102-1, 102-2, and 102-3 and Wi-Fi base stations 103-1 and 103-2 transmits the identity of each signal it has received from wireless terminal 101 and the measurements of the location-dependent traits of those signals. In accordance with the illustrative embodiment, task 901 is performed every 20 milliseconds, but it will be clear to those skilled in the art how to make and use alternative embodiments of the present invention that transmit the measurements at other times.

At task 902, location engine 113 receives the identities and measurements transmitted at task 901, through MNO infrastructure 111.

At task 903, wireless terminal 101 transmits the identity of each signal it receives from cellular base stations 102-1, 102-2, and 102-3 and Wi-Fi base stations 103-1 and 103-2 and the measurements of the location-dependent traits of those signals. In accordance with the illustrative embodiment, task 903 is performed every 20 milliseconds, but it will be clear to those skilled in the art how to make and use alternative embodiments of the present invention that transmit the measurements at other times.

At task 904, location engine 113 receives the identities and measurements transmitted at task 903, through MNO infrastructure 111.

In accordance with the illustrative embodiment, tasks 901, 902, 903, and 904 are performed continuously, concurrently, and asynchronously.

Figure 10:
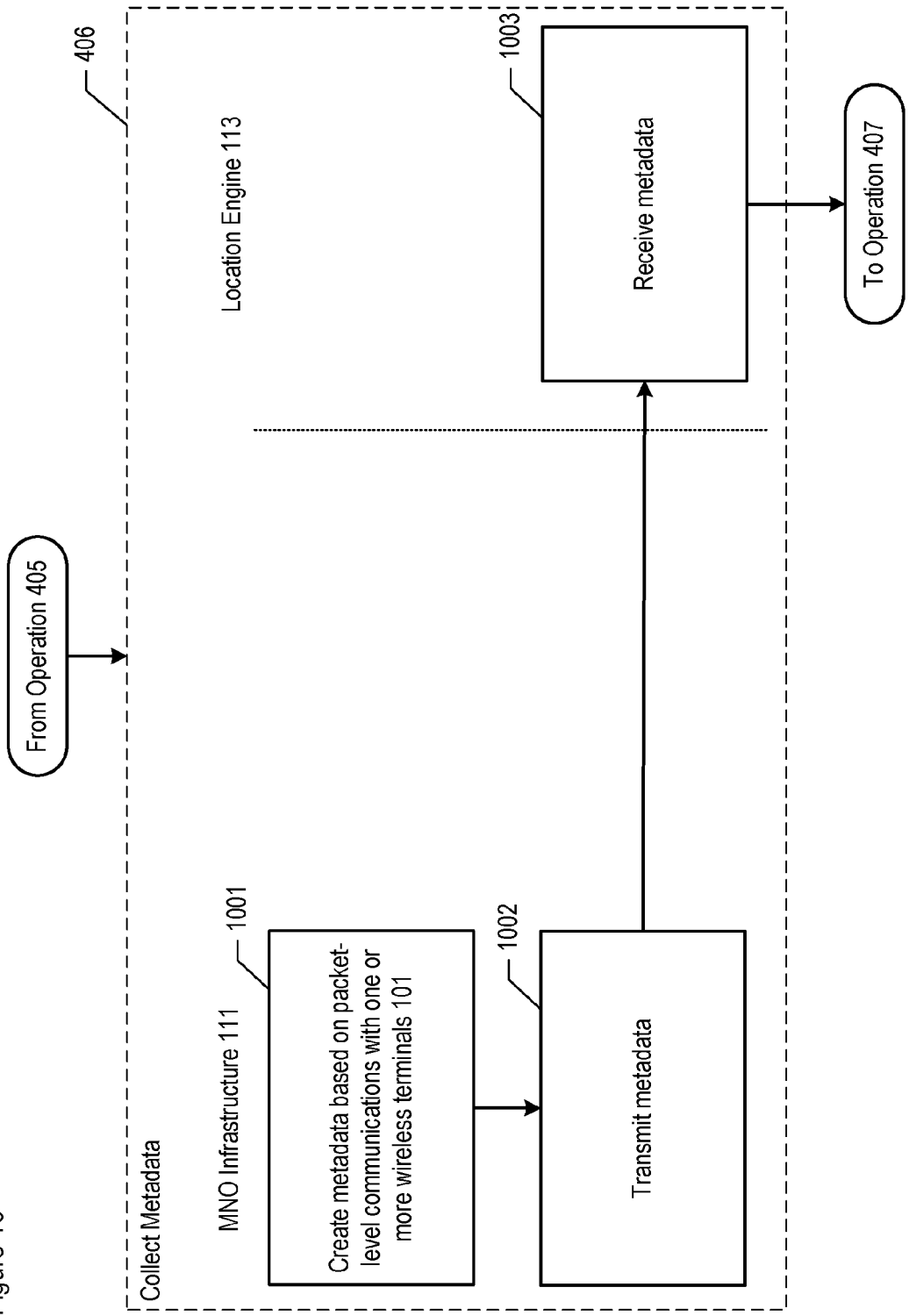
FIG. 10 depicts a flowchart of the salient processes performed in accordance with task 406.

Task 406: Collect Metadata Describing Packet-Level Communications—FIG. 10 depicts a flowchart of the salient processes performed in accordance with task 406.

At task 1001, MNO infrastructure 111 collects metadata that describes packet-level communications. The packet-level communications can comprise that between i) an infrastructure component within the MNO network (e.g., a GGSN, an SGSN, a router, a cellular base station, etc.), for one or more infrastructure components, and ii) one or more wireless terminals. In accordance with the illustrative embodiment, the metadata excludes the substantive content itself of any communication by an end user.

MNO infrastructure 111 can collect the metadata in any of various ways. For example and without limitation, the metadata can be collected on a Gn interface between a Gateway GPRS Support Node (GGSN) and a Serving GPRS Support Node (SGSN) within MNO infrastructure 111.

At task 1002, MNO infrastructure 111 transmits the metadata to location engine 113. In accordance with the illustrative embodiment, task 1002 is performed in response to a query from the location engine (e.g., for a particular end user or users, for a particular wireless terminal or terminals, etc.). However, as those who are skilled in the art will appreciate after reading this specification, the metadata can be transmitted to location engine 113 under different circumstances (e.g., periodically, sporadically, spontaneously, etc.).

In accordance with the illustrative embodiment, even when location engine 113 specifies the particular end user or wireless terminal of interest, infrastructure 111 can anonymize the data provided to location engine 113 such that individual users and/or their wireless terminals cannot be traced (i.e., their identities cannot be ascertained). This means that the metadata itself that describes the packet-level communication can be provided absent of any identification of the users and/or terminals. In some alternative embodiments, identification of at least some of the users and/or terminals can be present in the metadata. In some embodiments, identification of the other party on a call can be present in the metadata.

In accordance with the illustrative embodiment, any identification—be it explicit or otherwise—of a particular app that is downloaded—or resident in, or executing at—the wireless terminal, is absent from the metadata. In some alternative embodiments, identification of the app can be present in the metadata.

In accordance with the illustrative embodiment, any explicit identification of the wireless terminal being indoors or outdoors is absent from the metadata. In some alternative embodiments, identification of the wireless being indoors or outdoors can be present in the metadata.

At task 1003, location engine 113 receives the metadata transmitted at task 1002, through MNO infrastructure 111.

In accordance with the illustrative embodiment, tasks 1001, 1002, and 1003 are performed continuously, concurrently, and asynchronously.

Figure 11:
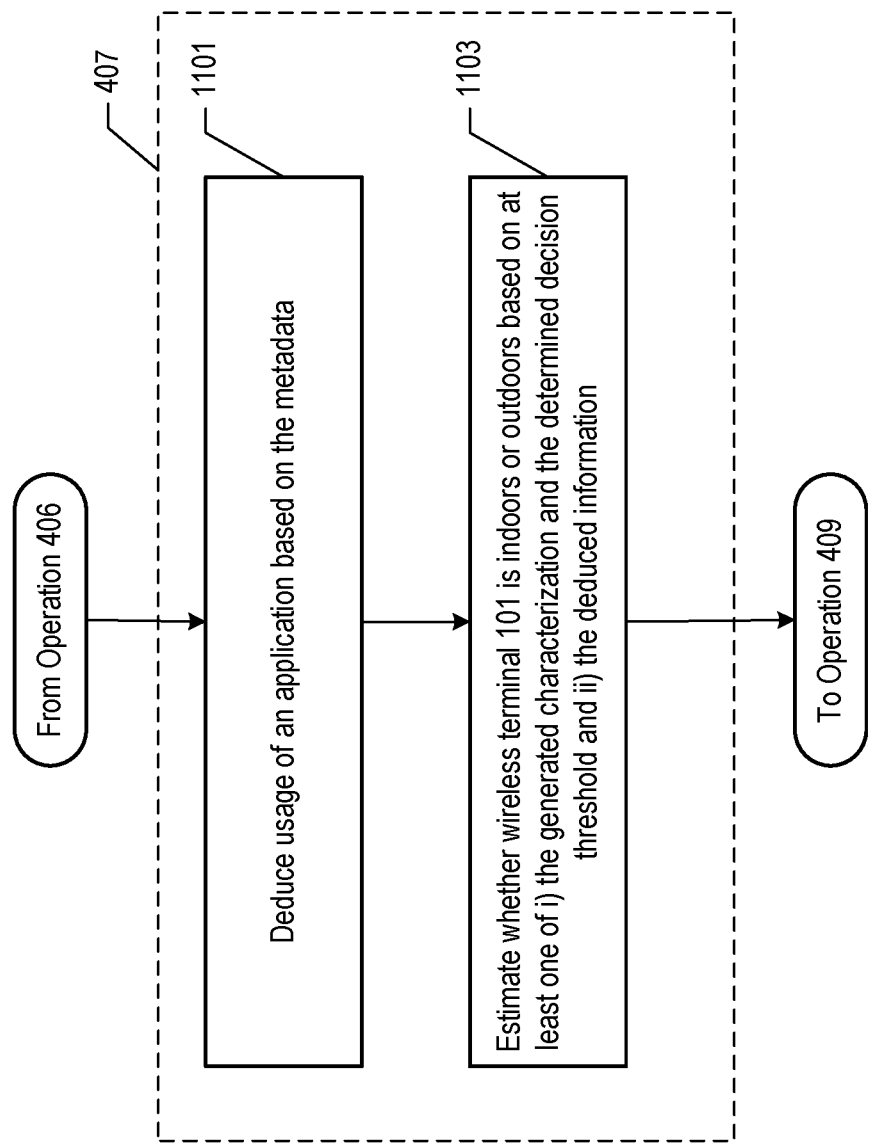
FIG. 11 depicts a flowchart of the salient processes performed in accordance with task 407.

Task 407: Generate an Estimate of Whether Terminal 101 is Indoors or Outdoors—FIG. 11 depicts a flowchart of the salient processes performed in accordance with task 407. In some embodiments of the present invention, location engine 113 can perform task 407 on metadata that describes packet-level communications involving more than one wireless terminal for which it has received metadata. For example, location engine 113 and/or MNO infrastructure 111 might be aware that a particular end user has multiple wireless terminals; in this case, infrastructure 111 can provide and engine 113 can process metadata for the multiple terminals.

At task 1101, location engine 113 deduces the usage of a particular application based on the metadata. In some embodiments of the present invention, the usage of the app is responsible for generating at least some of the packet-level communications described by the metadata being used. The deducing of the particular application can be accounted for implicitly as part of the composite characterization generated in accordance with task 605, in which case the deducing is performed as part of task 1103 below.

In some alternative embodiments of the present invention, the deducing of the particular application can be performed explicitly as its own step. The deducing can be based on a solution vector approach, similar to what is discussed in regard to task 1103 below, but applied to classifying the metadata as being associated with a particular device app.

In some embodiments of the present invention, the deducing of the particular application can be based on an average inter-arrival time of the packets and/or an average packet size.

At task 1103, location engine 113 generates an estimate of whether wireless terminal is indoors or outdoors, based on the solution vector x and on $\alpha=[1, f_1, f_2, \ldots, f_{m-1}]$, where $f_1$ through $f_{m-1}$ are the feature values computed from the call data in accordance with task 601. Because indoor was set to one, and outdoor to zero, the classification is based on $$\text{if}(\alpha x > T), \text{ then indoor=true, else outdoor=true.} \quad \text{(Eq. 3)}$$

wherein T is the decision threshold determined earlier.

In some embodiments of the present invention, location engine 113 also estimates a probability that the wireless terminal is correctly classified as indoors (or outdoors), in well-known fashion. For example and without limitation, the estimated probability can be based on where the decision threshold is set in relation to the cumulative distribution functions in FIG. 8, which dictates how likely it is that the wireless terminal is outdoors when it is decided that the wireless terminal is indoors, and vice-versa.

As those who are skilled in the art will appreciate, after reading this specification, the rest of the location estimation process can be based on the probability estimate generated. For example, the location estimation can react one way if the estimated probability of the wireless terminal being indoors is 95%, while the location estimation can react a different way if the estimated probability is 50%.

In accordance with the illustrative embodiment of the present invention, the detection of whether wireless terminal 101 is indoors or outdoors is based on a relatively short sequence of measurement data. However, as those who are skilled in the art will appreciate after reading this specification, the detection of whether wireless terminal 101 is indoors or outdoors can be based on one or more of i) one or more prior detections of the wireless terminal being indoors, ii) one or more prior detections of the wireless terminal being outdoors, and iii) one or more prior estimates of the location of the wireless terminal, in any combination thereof.

Figure 12:
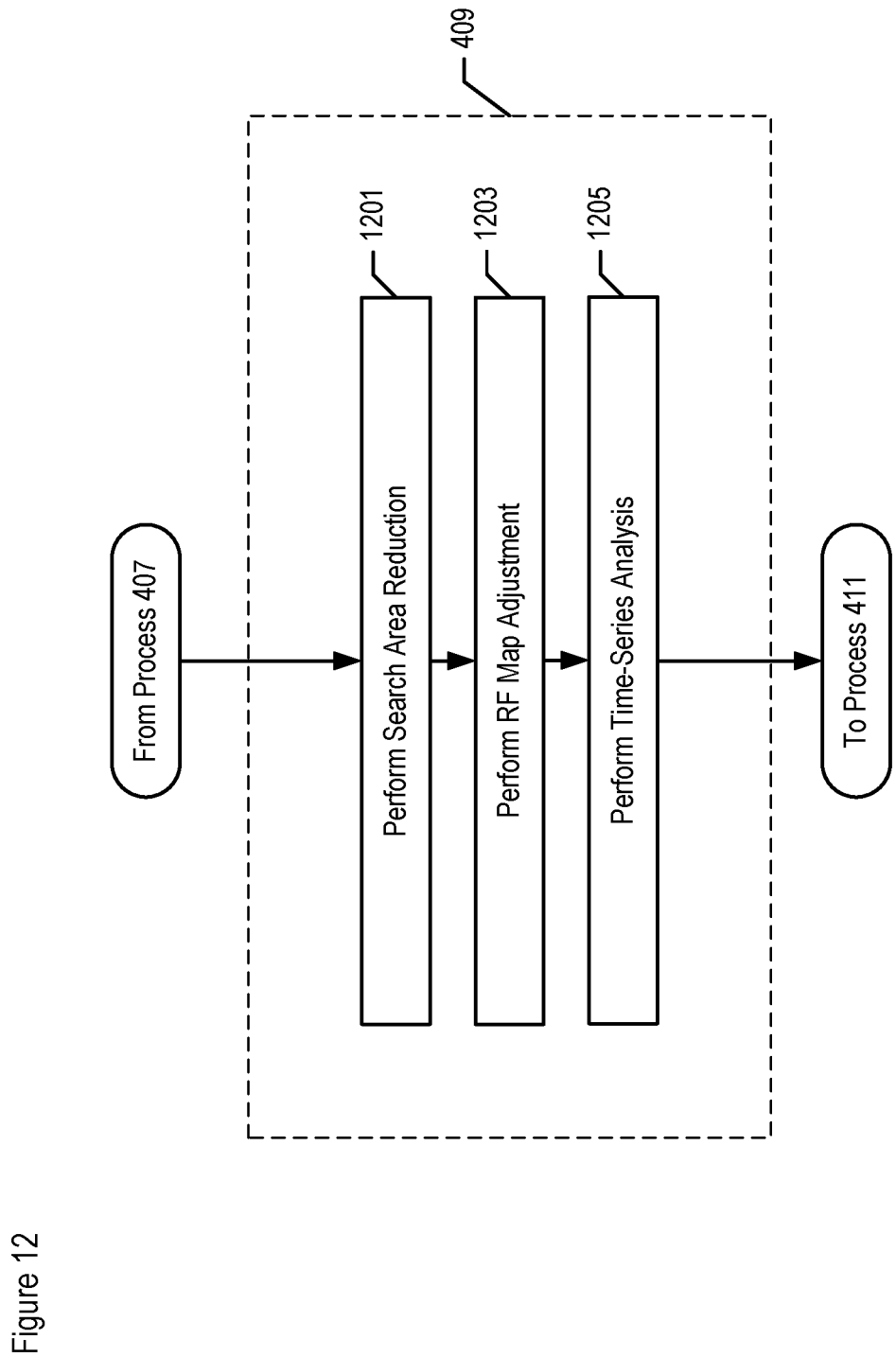
FIG. 12 depicts a flowchart of the salient processes performed in task 409.

Generating an Estimate of the Location of Wireless Terminal 101—FIG. 12 depicts a flowchart of the salient processes performed in task 409—generating an estimate of the location of wireless terminal 101. As an overview, Y probability distributions for the location of wireless terminal 101 are generated for each of instants $H_1$ through $H_Y$ in the temporal interval $\Delta T$, wherein Y is a positive integer, based on comparing the measurements of traits associated with wireless terminal 101 (i.e., the values obtained in task 904) at each of instants $H_1$ through $H_Y$, to predicted values for those traits at those times. Each of the Y probability distributions provides a first estimate of the probability that wireless terminal 101 is in each location at each of instants $H_1$ through $H_Y$. This handling of the probability distributions is described below and in task 1205, resulting in the estimate.

In accordance with task 1201, location engine 113 performs a technique called "search area reduction" in preparation for task 1205. To understand what search area reduction is and why it is advantageous, a brief discussion of task 1205 is helpful. In task 1205, location engine 113 performs a time-series analysis in order to estimate the probability that wireless terminal 101 is in each location at each of instants $H_1$ through $H_Y$. This requires generating Y multi-dimensional probability distributions, one for each of instants $H_1$ through $H_Y$.

The process for generating each multi-dimensional probability distribution can be computationally intensive and the intensity depends on the number of locations that must be considered as possible locations for wireless terminal 101. When the number of locations that must be considered is small, the process can be performed quickly enough for many "real-time" applications. In contrast, when the number of locations that must be considered is large, the process can often take too long.

Nominally, all of the locations in geographic region 120 must be considered because, prior to task 1201, wireless terminal 101 could be in any location out of possibly thousands, millions, or billions of locations. The consideration of thousands, millions, or billions of locations for each instant by location engine 113 might take too long for many real-time applications.

Therefore, to expedite the performance of task 1205, location engine 113 performs one or more computationally-efficient tests that quickly and summarily eliminate many possible locations for wireless terminal 101 from consideration, and, therefore, summarily set to zero the probability that wireless terminal 101 is at those locations. This reduces the number of locations that must be fully considered in task 1205 and generally improves the speed with which task 409 is performed.

For additional information in regard to location estimation, including the time-series analysis performed at task 1105, see for example and without limitation U.S. Pat. Nos. 6,944,465, 7,460,505, 7,383,051, 7,257,414, 7,753,278, 7,433,695, 7,848,762, and 8,630,665, each of which is incorporated by reference herein.

Figure 13:
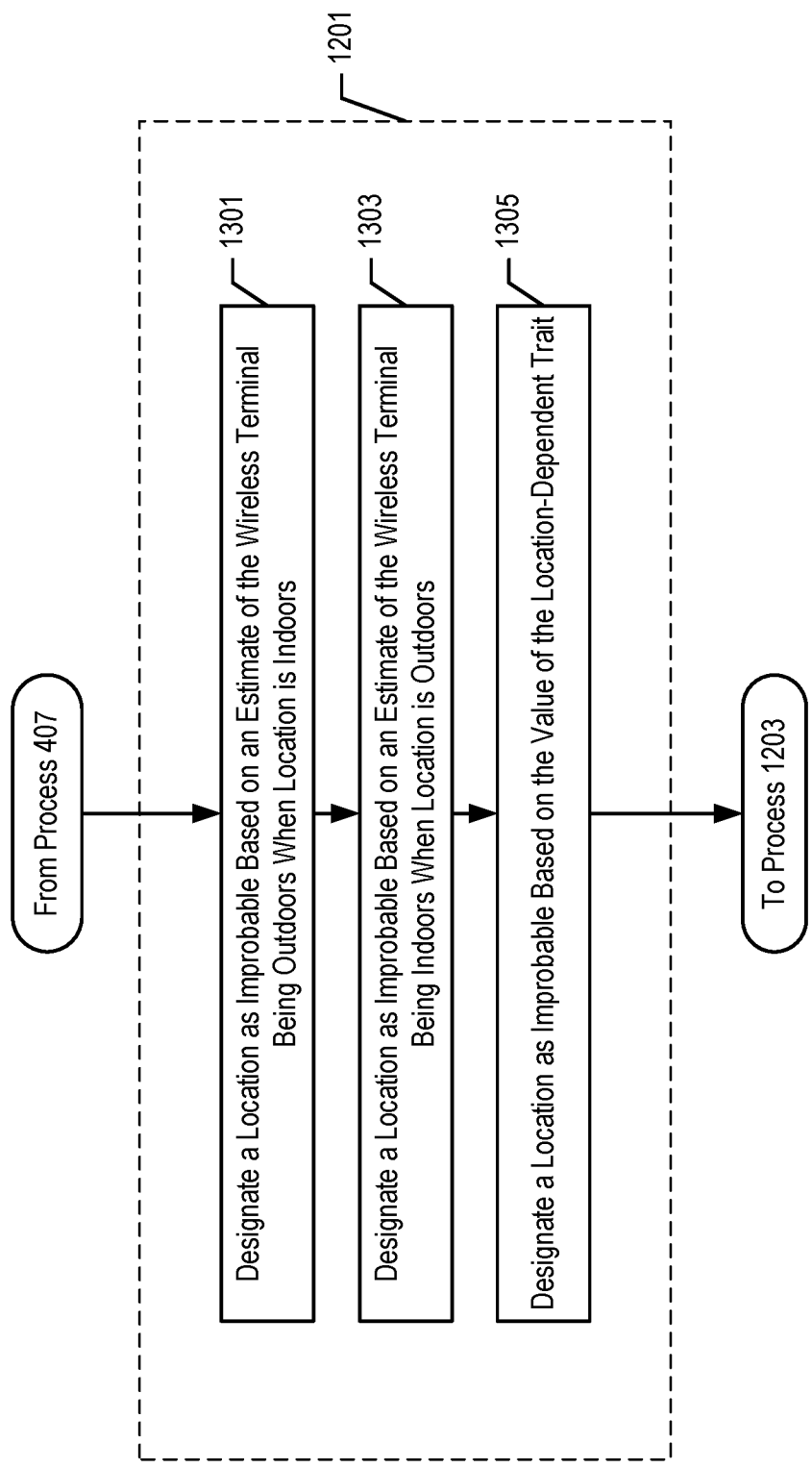
FIG. 13 depicts a flowchart of the salient processes performed in accordance with task 1201.

FIG. 13 depicts a flowchart of the salient processes performed in accordance with task 1201—search area reduction. In some embodiments of the present invention, location engine 113 uses additional techniques to those described below, in order to perform search area reduction.

In accordance with task 1301, location engine 113 designates a location as improbable based on an estimate of wireless terminal 101 being outdoors, when the location is known to be indoors. The theory underlying this test is when the terminal is estimated to be outdoors, any indoor location is considered to be invalid. Although it is possible that the estimate of the wireless terminal being outdoors might be wrong, the possibility of this occurring can be minimized by selecting the proper criteria (e.g., decision threshold, etc.) for generating the estimate in task 1103.

In accordance with task 1303, location engine 113 designates a location as improbable based on an estimate of wireless terminal 101 being indoors, when the location is known to be outdoors. The theory underlying this test is when the terminal is estimated to be indoors, any outdoor location is considered to be invalid. Although it is possible that the estimate of the wireless terminal being indoors might be wrong, the possibility of this occurring can be minimized by selecting the proper criteria (e.g., decision threshold, etc.) for generating the estimate in task 1103.

In some embodiments of the present invention, the probability value estimated at task 1103 is taken into account. For example and without limitation, a sufficiently high probability (e.g., 90%, 95%, 98%, etc.) that wireless terminal 101 is correctly classified might be required in order to designate a location as improbable based on the indoors-outdoors criterion.

In some embodiments of the present invention, a location or portion of a location is known to be indoors or outdoors based on the information (e.g., structures, etc.) contained in the GIS database constructed at task 501. Portions of a particular location might be indoors while other portions of the location might be outdoors, instead of a particular location being either all indoors or all outdoors. In those embodiments, tasks 1301 and 1303 can be ignored or each location in the location-trait database constructed at task 503 in FIG. 5 can be subdivided for the purpose of tracking the indoor portions and outdoor portions of each location.

In some embodiments of the present invention, certain information can be deduced or inferred based on the estimate of the wireless terminal being indoors or outdoors. For example and without limitation, a wireless terminal might be deduced as being at ground level when estimated to be outdoors, whereas the same is less likely to be true when the wireless terminal is estimated to be indoors (e.g., could be many floors above ground level, etc.).

In accordance with task 1305, location engine 113 designates a location as improbable based on the measurement of the location-dependent trait obtained at task 902 and/or 904. Various tests for designating a location as improbable and that are based on the value of the location-dependent trait are described in U.S. Pat. No. 7,257,414, which is incorporated by reference herein.

A location that that is designated as improbable at instant $H_i$ by one or more of the foregoing processes is designated as improbable by task 1201 at instant $H_i$.

Figure 14:
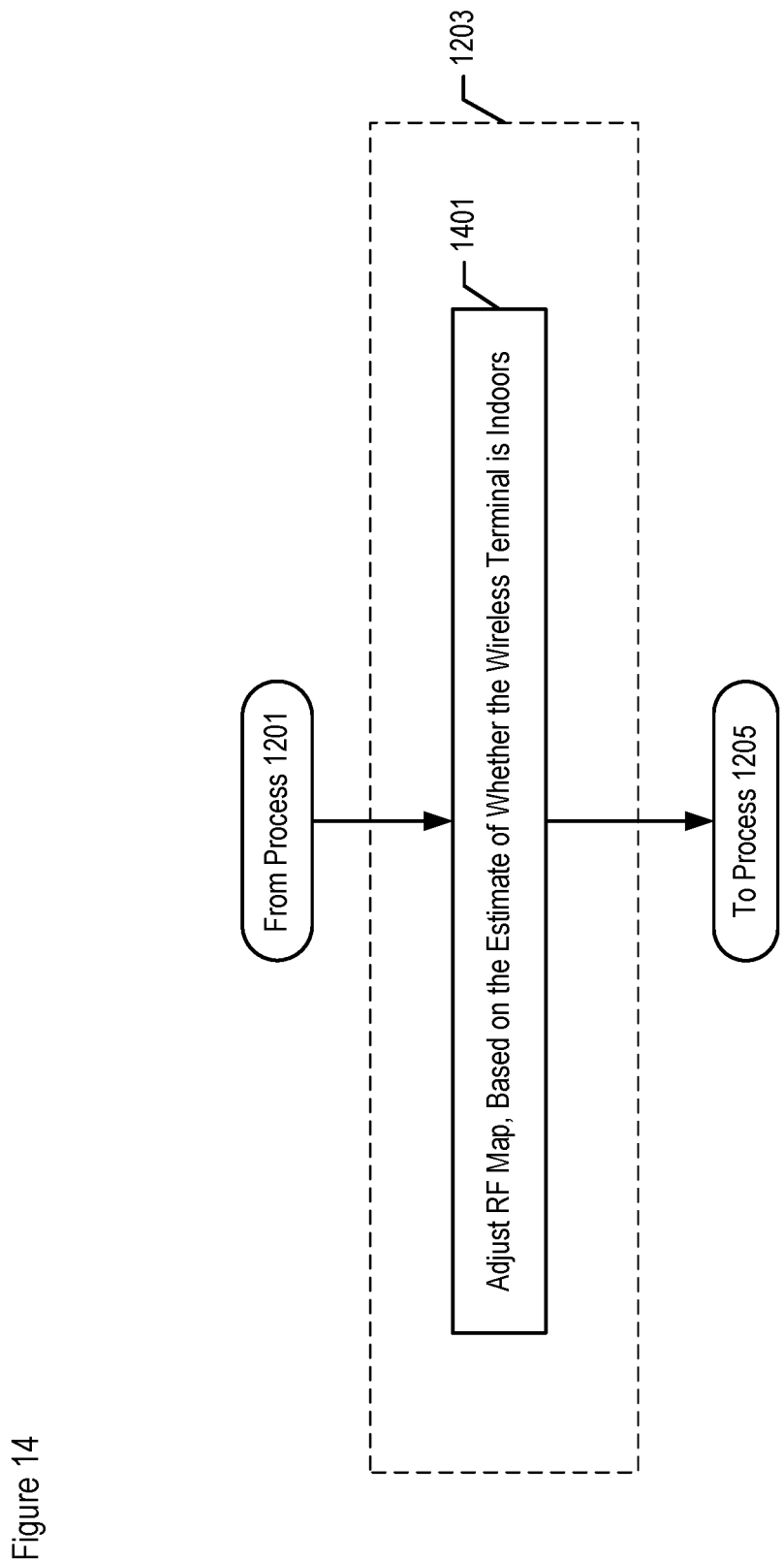
FIG. 14 depicts a flowchart of the salient processes performed in accordance with task 1203.

FIG. 14 depicts a flowchart of the salient processes performed in accordance with task 1203—map adjustment. In accordance with task 1203, location engine 113 adjusts an RF map in preparation for task 1205, wherein the map is described above and in FIG. 3. In particular, engine 113 adjusts the map that associates: i) a plurality of possible locations of wireless terminal 101 with ii) a predicted value of the location-dependent trait associated with each of the plurality of possible locations of the wireless terminal. The map correlates each of a plurality of locations to one or more predicted traits associated with a wireless terminal at that location. As described in FIG. 3, the maps are stored as part of the location-trait database at location engine 113.

In accordance with task 1401, location engine 113 adjusts the relevant map stored in the location-trait database, based on an estimate of wireless terminal 101 being indoors.

The theory underlying this adjustment is explained here. As described above, the map correlates each of a plurality of locations to one or more predicted traits associated with a wireless terminal at that location. Each location represented in the map, however, might comprise one or more portions that are indoors and one or more portions that are outdoors. Additionally, the predicted value of each location-dependent trait stored for that location might be representative of the indoor portions or of the outdoor portions, but not necessary of both. Therefore, the predicted values of one or more location-dependent traits for the location may have to be adjusted accordingly, based on whether wireless terminal is estimated to be indoors or outdoors. For example, the predicted signal strength for a particular location might be too high for an indoor portion of the location or too low for an outdoor portion of a location, or both; consequently, the predicted signal strength would have to be adjusted accordingly.

In some embodiments of the present invention, the probability value estimated at task 1103 is taken into account. For example and without limitation, a sufficiently high probability (e.g., 90%, 95%, 98%, etc.) that wireless terminal 101 is correctly classified might be required in order to adjust the map based on the indoors-outdoors criterion.

Classification methods for the purpose of detecting whether a wireless terminal is indoors or outdoors have been disclosed herein. However, as those who are skilled in the art will appreciate after reading this specification, the classification methods disclosed herein can also be applied for the purpose of detecting a different type of status of the terminal, such as whether the terminal is moving or stationary (i.e., instead of or in addition to detecting whether the terminal is indoors or outdoors), a direction of movement, a speed of movement, or a mode of transportation. Classification methods can also be applied for the purpose of characterizing the end user or wireless terminal itself.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the location of a wireless terminal executing an application, the method comprising:
   receiving, by a computer system, metadata that describes packet-level communications between a mobile network operator (MNO) telecommunications network and the wireless terminal, wherein any identification of the application is absent from the metadata, and wherein the metadata is obtained from call detail records (CDR) that are produced by a telecommunications equipment component within the MNO telecommunications network;
   deducing, by the computer system, usage of the application based on the metadata, wherein the usage of the application is responsible for generating at least some of the packet-level communications described by the metadata; and
   estimating, by the computer system, a probability that the wireless terminal is indoors based the deducing of the usage of the application.

2. The method of claim 1 wherein the metadata on which the deducing is based comprises the start times of two consecutive packets.

3. The method of claim 1 wherein the metadata on which the deducing is based comprises a start time and an end time of a first packet.

4. The method of claim 1 wherein the deducing is based on an average inter-arrival time of a plurality of packets.

5. The method of claim 1 wherein the deducing is based on an average packet size.

6. The method of claim 1 wherein the estimating of the probability is also based on a metric or statistic not considered in the deducing of the usage.

7. The method of claim 1 further comprising:
   designating, by the computer system, at least one of a plurality of possible locations of the wireless terminal as improbable based on the estimated probability that the wireless terminal is indoors; and
   estimating, by the computer system, the location of the wireless terminal to be one of the plurality of possible locations of the wireless terminal not designated as improbable.

8. The method of claim 7 further comprising:
   receiving, by the computer system, a measurement of a location-dependent trait of a radio signal as received by the wireless terminal;

wherein the estimating of the location of the wireless terminal is based on the measurement of the location-dependent trait of the radio signal.

9. A method of estimating the location of a wireless terminal, the method comprising:

receiving, by a computer system, metadata that describes packet-level communications between a mobile network operator (MNO) telecommunications network and the wireless terminal, wherein the metadata is obtained from call detail records (CDR) that are produced by a telecommunications equipment component within the MNO telecommunications network;

receiving, by the computer system, a measurement of a location-dependent trait of a radio signal as received by the wireless terminal; and estimating, by the computer system, a probability that the wireless terminal is indoors based on a characterization of a first classification feature, wherein the characterization is based on the metadata; and generating, by the computer system, an estimate of the location of the wireless terminal based on i) the measurement of the location-dependent trait of the radio signal and ii) the estimated probability that the wireless terminal is indoors.

10. The method of claim 9 further comprising:

designating, by the computer system, at least one of a plurality of possible locations of the wireless terminal as improbable based on the estimated probability that the wireless terminal is indoors;

wherein the estimate of the location of the wireless terminal is one of the plurality of possible locations of the wireless terminal not designated as improbable.

11. The method of claim 9 further comprising:

designating, by the computer system, at least one of a plurality of possible locations of the wireless terminal as improbable;

wherein the estimate of the location of the wireless terminal is determined to be one of the plurality of possible locations of the wireless terminal not designated as improbable, and is based on the measurement of the location-dependent trait of the radio signal and on an adjusted database value of the location-dependent trait, wherein the adjusted database value is based on the estimated probability that the wireless terminal is indoors.

12. The method of claim 9 wherein the characterization relates to deducing usage of an application based on the metadata, wherein the wireless terminal is executing the application, wherein the usage of the application is responsible for generating at least some of the packet-level communications described by the metadata, wherein the estimating of the probability is further based on the deducing of the usage of the application, and wherein any identification of the application is absent from the metadata.

13. The method of claim 12 wherein the metadata on which the deducing is based comprises start times of two consecutive packets.

14. The method of claim 12 wherein the metadata on which the deducing is based comprises a start time and an end time of a first packet.

15. The method of claim 12 wherein the deducing is based on an average inter-arrival time of a plurality of packets.

16. A method of estimating the location of a wireless terminal, the method comprising:

receiving, by a computer system, metadata that describes packet-level communications between a mobile network operator (MNO) telecommunications network and the wireless terminal, wherein any explicit indication of the wireless terminal being indoors or outdoors is absent from the metadata, and wherein the metadata is obtained from call detail records (CDR) that are produced by a telecommunications equipment component within the MNO telecommunications network;

receiving, by the computer system, a measurement of a location-dependent trait of a radio signal as received by the wireless terminal;

estimating, by the computer system, a probability that the wireless terminal is indoors based on the metadata;

designating, by the computer system, at least one of a plurality of possible locations of the wireless terminal as improbable based on the estimated probability that the wireless terminal is indoors; and generating, by the computer system, an estimate of the location of the wireless terminal as being one of the plurality of possible locations of the wireless terminal not designated as improbable, based on the measurement of the location-dependent trait of the radio signal.

17. The method of claim 16 further comprising deducing, by the computer system, usage of an application based on the metadata, wherein the wireless terminal is executing the application, wherein the usage of the application is responsible for generating at least some of the packet-level communications described by the metadata, wherein the estimating of the probability is further based on the deducing of the usage of the application, and wherein any identification of the application is absent from the metadata.

18. The method of claim 17 wherein the metadata on which the deducing is based comprises start times of two consecutive packets.

19. The method of claim 17 wherein the metadata on which the deducing is based comprises a start time and an end time of a first packet.

20. The method of claim 17 wherein the deducing is based on an average inter-arrival time of a plurality of packets.

* * * * *